US007664827B2

(12) United States Patent
Kamata et al.

(10) Patent No.: US 7,664,827 B2
(45) Date of Patent: Feb. 16, 2010

(54) SERVER, INFORMATION PROVIDING METHOD AND RECORDING MEDIUM FOR DISTRIBUTING A TERMINAL WITH INFORMATION CONTAINING MENU AND LINK ARRANGED ON IMAGE

(75) Inventors: Atsushi Kamata, Toyota (JP); Shintaro Sakurai, Tokyo (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 711 days.

(21) Appl. No.: 10/504,188

(22) PCT Filed: Feb. 18, 2003

(86) PCT No.: PCT/JP03/01735

§ 371 (c)(1),
(2), (4) Date: Aug. 11, 2004

(87) PCT Pub. No.: WO03/071448

PCT Pub. Date: Aug. 28, 2003

(65) Prior Publication Data

US 2005/0120076 A1 Jun. 2, 2005

(30) Foreign Application Priority Data

Feb. 22, 2002 (JP) ............................ 2002-047028

(51) Int. Cl.
*G06F 15/16* (2006.01)

(52) U.S. Cl. ........................ 709/217; 709/218; 709/219

(58) Field of Classification Search ................. 709/217, 709/203, 220, 238, 224, 250; 907/217
See application file for complete search history.

(56) References Cited

U.S. PATENT DOCUMENTS 5,724,512 A * 3/1998 Winterbottom ............. 709/226
6,119,109 A * 9/2000 Muratani et al. ........... 705/400
6,396,531 B1 * 5/2002 Gerszberg et al. ........ 348/14.01
2001/0015972 A1 * 8/2001 Horiguchi et al. ........... 370/352

(Continued)

FOREIGN PATENT DOCUMENTS

JP A-05-205003 8/1993

(Continued)

OTHER PUBLICATIONS

Kadooka, "WildBird Service System for Mobile Computing Terminal-Map-Based Internet Service-," Fujitsu, vol. 48, No. 2, pp. 194-199, Mar. 10, 1997.

(Continued)

*Primary Examiner*—Jeffrey Pwu
*Assistant Examiner*—Abdelnabi O Musa
(74) *Attorney, Agent, or Firm*—Oliff & Berridge, PLC

(57) ABSTRACT

A server for distributing information provided by an information provider as an information element group consisting of one or more information elements connected, to a user terminal. The server includes means for creating a hierarchical structure between the information elements via an image, means for receiving an access to an image related to the first information element, means for searching a second information element constituting a hierarchical structure with the first information element via the image, and means for arranging the second information element on the image and distributing it to the user terminal.

3 Claims, 34 Drawing Sheets

U.S. PATENT DOCUMENTS

| | | | | |
|---|---|---|---|---|
| 2001/0037345 | A1 | 11/2001 | Kiernan et al. | |
| 2002/0013944 | A1 * | 1/2002 | Gordon et al. | 725/39 |
| 2002/0116282 | A1 * | 8/2002 | Martin et al. | 705/26 |
| 2002/0120682 | A1 * | 8/2002 | Funaki | 709/203 |

FOREIGN PATENT DOCUMENTS

| | | |
|---|---|---|
| JP | A 09-054776 | 2/1997 |
| JP | A 10-143529 | 5/1998 |
| JP | 10-177584 | 6/1998 |
| JP | A-10-222527 | 8/1998 |
| JP | A 10-312452 | 11/1998 |
| JP | A 2000-083059 | 3/2000 |
| JP | A 2001-216235 | 8/2001 |
| JP | A 2001-223731 | 8/2001 |
| JP | A 2001-229452 | 8/2001 |
| JP | A 2001-318925 | 11/2001 |

OTHER PUBLICATIONS

Shao Quanqin et al., "Layer-map-atlas Hierarchical Method for Map Data Organization," 53 China Academic Journal Electronic Publishing House (1994-2006).

* cited by examiner

| | | |
|---|---|---|
| ICON INFORMATION DB | INFORMATION CAPSULE ID (URL) | CATV ENTREPRENEUR CODE + CATV SUBSCRIBER CODE + SERIAL NUMBER |
| | ICON FILE NAME 1 | ICON IMAGE IS STORED IN FILE MANAGED WITH FILE NAME FOR EVERY PLURALITY OF ICON TYPES |
| | ICON FILE NAME 2 | FILE IS PREPARED FOR EVERY PLURALITY OF ICON TYPES |
| | ⋮ | ICON TYPE, 1:STANDARD ICON TYPE/2:SMALL ICON TYPE/3:BANNER TYPE/4:LIST FORMING TYPE |
| | | |

| | | |
|---|---|---|
| ATTRIBUTE INFORMATION DB | INFORMATION CAPSULE ID | CATV ENTREPRENEUR CODE + CATV SUBSCRIBER CODE + SERIAL NUMBER |
| | INFORMATION CAPSULE NAME | NAME IS PREPARED FOR EVERY PLURALITY OF INTERNET ACCESS DEVICES 1:FOR PC /2:FOR CELL PHONE/ 3:FOR PDA /4:FOR WEB TV |
| | ATTRIBUTE | CAPSULE ATTRIBUTE CODE 1:INDIVIDUAL PRACTICE DOCTOR/ 2:HOSPITAL /3:RESTAURANT/ 4:CONVENIENCE STORE, ETC. |
| | VALID PERIOD | EFFECTIVE DATE(YEAR/MONTH/DAY)/ EXPIRATION DATE (YEAR/MONTH/DAY) |
| | CAPSULE LINK INFORMATION | INFORMATION CAPSULE ID THAT IS OF HIGHER-ORDER BY ONE LAYER |

| | | |
|---|---|---|
| MENU/LINK INFORMATION DB | INFORMATION CAPSULE ID | CATV ENTREPRENEUR CODE + CATV SUBSCRIBER CODE + SERIAL NUMBER |
| | MENU HIERARCHICAL INFORMATION | MENU HIERARCHY COUNT (3 AT MAXIMUM) |
| | FIRST HIERARCHY INFORMATION | MENU COUNT |
| | | MENU TEXT (MANAGED SEPARATELY BY USAGE ACCORDING TO PC, CELL PHONE, ETC.) |
| | | MENU-TEXT-BY-MENU-TEXT LINK INFORMATION (IMAGE FILE OR URL) |
| | | POINTER TO SECOND HIERARCHY INFORMATION |
| | | REPEATING HEREINAFTER BY MENU COUNT |
| | SECOND HIERARCHY INFORMATION | MENU COUNT |
| | | MENU TEXT (MANAGED SEPARATELY ACCORDING TO PC, CELL PHONE, ETC.) |
| | | MENU-TEXT-BY-MENU-TEXT LINK INFORMATION |
| | | POINTER TO THIRD HIERARCHY INFORMATION |
| | | REPEATING HEREINAFTER BY MENU COUNT |
| | THIRD HIERARCHY INFORMATION | MENU COUNT |
| | | MENU TEXT (MANAGED SEPARATELY ACCORDING TO PC, CELL PHONE, ETC.) |
| | | MENU-TEXT-BY-MENU-TEXT LINK INFORMATION |

| | | |
|---|---|---|
| POSITION INFORMATION DB | INFORMATION CAPSULE ID (URL) | CATV ENTREPRENEUR CODE + CATV SUBSCRIBER CODE + SERIAL NUMBER |
| | CATEGORY FOR POSITION | CATEGORIES FOR SPECIFYING POSITIONS 1:MAP/ 2:IMAGE/ 3:NOTHING ETC. |
| | POSITION INFORMATION | LATITUDE AND LONGITUDE INFORMATION FOR IN THE CASE OF MAP/IMAGE NO. OF BACKGROUND IMAGE AND RELATIVE DOT DATA WITHIN IMAGE IN THE CASE OF IMAGE/[NULL] IN THE CASE OF NOTHING |

| INFORMATION CAPSULE ID | HIGH-ORDER CAPSULE ID | CAPSULE UPDATE STATUS |
|---|---|---|
| A | NOTHING | UPDATE OCCURRED |
| B1 | A | |
| B2 | A | |
| B3 | A | |
| B4 | A | UPDATE OCCURRED |
| B5 | A | |
| C1 | B4 | |
| C2 | B4 | UPDATE OCCURRED |
| C3 | B4 | |
| C4 | B4 | |
| C5 | B4 | |
| D1 | C2 | |
| D2 | C2 | |
| D3 | C2 | UPDATE OCCURRED |

FIG. 28

```
<BUILDING CAPSULE CAPSULE ID=OOO>
      <LATITUDE>······OMITTED······</LATITUDE>
      <LONGITUDE>······OMITTED······</LONGITUDE>
      <LARGE ICON>······OMITTED······</LARGE ICON>
      <INTERMEDIATE ICON>······OMITTED······</INTERMEDIATE ICON>
      <SMALL ICON>······OMITTED······</SMALL ICON>
      <ICON BANNER>······OMITTED······</ICON BANNER>
      <LARGE ICON PHOTO>······OMITTED······</LARGE ICON PHOTO>
      <SMALL ICON PHOTO>······OMITTED······</SMALL ICON PHOTO>
      <ICON TEXT>······OMITTED······</ICON TEXT>

    <EVENT CAPSULE CAPSULE ID=OOO>····OMITTED····</EVENT CAPSULE>
    <LINK URL>······OMITTED······</LINK URL>
    <FLOOR CAPSULE CAPSULE ID=OOO>
          <LARGE ICON>······OMITTED······</LARGE ICON>
          <INTERMEDIATE ICON>······OMITTED······</INTERMEDIATE ICON>
          <SMALL ICON>······OMITTED······</SMALL ICON>
          <ICON BANNER>······OMITTED······</ICON BANNER>
          <FLOOR PICTORIAL SKETCH>······· OMITTED······· </FLOOR PICTORIAL SKET
          <ICON TEXT>······OMITTED······</ICON TEXT>
       <EVENT CAPSULE CAPSULE ID=OOO>······OMITTED······</EVENT CAPSULE>
       <LINK URL>······OMITTED······</LINK URL>
       <SHOP CAPSULE CAPSULE ID=OOO>
          <LARGE ICON>······OMITTED······</LARGE ICON>
          <INTERMEDIATE ICON>······OMITTED······</INTERMEDIATE ICON>
          <SMALL ICON>······OMITTED······</SMALL ICON>
          <ICON BANNER>······OMITTED······</ICON BANNER>
          <ICON TEXT>······OMITTED······</ICON TEXT>
          <LINK URL>······OMITTED······</LINK URL>
              <ARTICLE CAPSULE CAPSULE ID=OOO>
                 <LARGE ICON PHOTO>······OMITTED······</LARGE ICON PHOTO>
                 <SMALL ICON PHOTO>······OMITTED······</SMALL ICON PHOTO>
                 <ICON TEXT>······OMITTED······<ICON TEXT>
                 <NAME OF ARTICLE>······OMITTED······</NAME OF ARTICLE>
                 <ITEM NUMBER>······OMITTED······</ITEM NUMBER>
                 <PRICE>······OMITTED······</PRICE>
                 <COMMENT>······OMITTED······</COMMENT>
                 <PHOTO>······OMITTED······</PHOTO>
                 <INSERTION PERIOD>······OMITTED······</INSERTION PERIOD>
                 <LINK URL>······OMITTED······</LINK URL>
                 </ARTICLE CAPSULE>
            <ARTICLE CAPSULE CAPSULE ID=OOO>····OMITTED····</ARTICLE CAPSULE>

            <ARTICLE CAPSULE CAPSULE ID=OOO>····OMITTED····</ARTICLE CAPSULE>
       </SHOP CAPSULE>
    </FLOOR CAPSULE>
</BUILDING CAPSULE>
```

*FIG. 31*

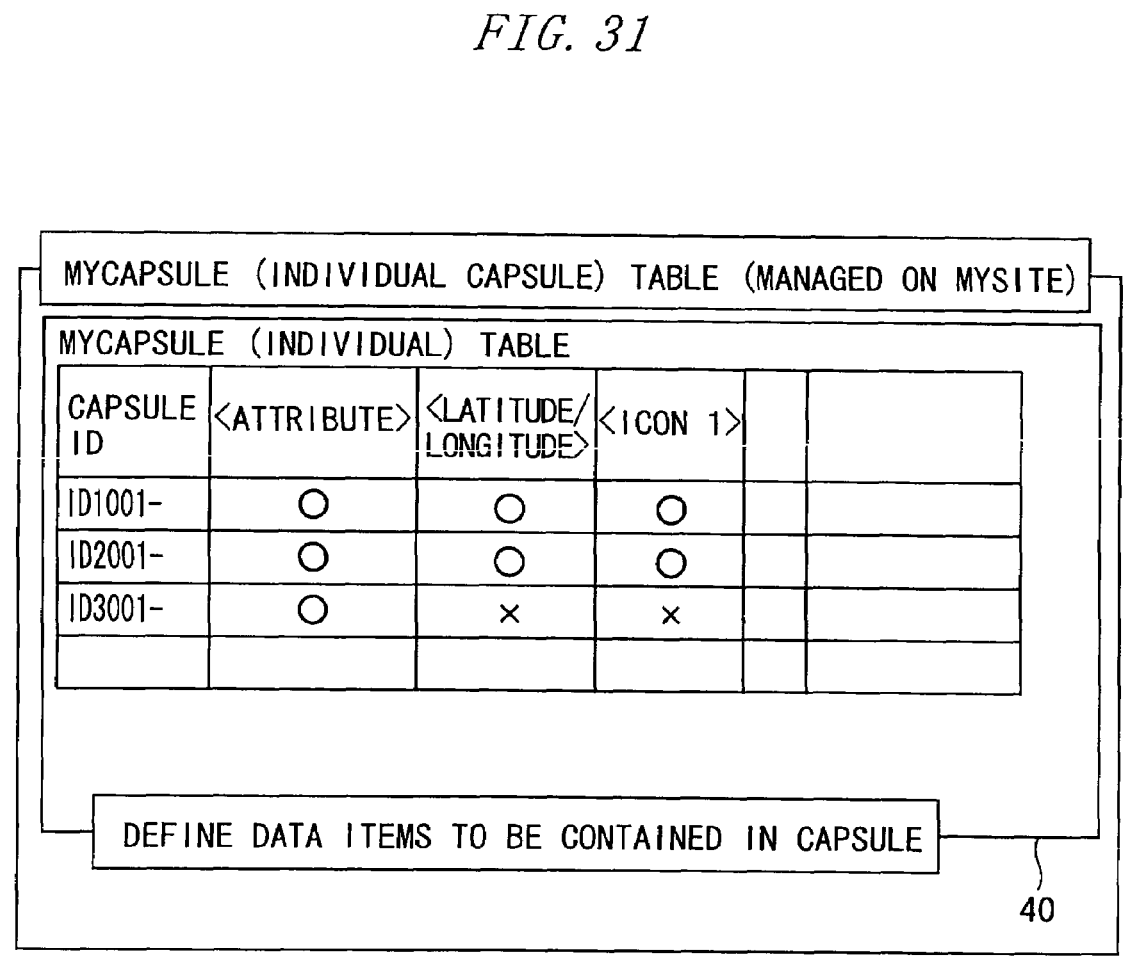

MYCAPSULE (INDIVIDUAL CAPSULE) TABLE (MANAGED ON MYSITE)

MYCAPSULE (INDIVIDUAL) TABLE

| CAPSULE ID | <ATTRIBUTE> | <LATITUDE/ LONGITUDE> | <ICON 1> | | |
|---|---|---|---|---|---|
| ID1001- | ○ | ○ | ○ | | |
| ID2001- | ○ | ○ | ○ | | |
| ID3001- | ○ | × | × | | |
| | | | | | |

DEFINE DATA ITEMS TO BE CONTAINED IN CAPSULE

| <SHOP ID>ID NUMBER | <SHOP>SHOP NAME |
|---|---|

| ARTICLE ID | <ARTICLE NAME> | <ITEM NUMBER> | <PRICE> | <PHOTO> | <COMMENT> |
|---|---|---|---|---|---|
| ENCAPSULATION BATCH DESIGNATION | (○) | (×) | (○) | (×) | (×) |
| ID3001 | ○○ARTICLE | | | | |
| ID3002 | △×ARTICLE | | | | |
| ID3003 | ××ARTICLE | | | | |

| ID | <ATTRIBUTE> | <LATITUDE LONGITUDE> | <ICON 1> |
|---|---|---|---|
| ID1001 | BUILDING | DATA | IMAGE |
| ID2001 | SHOP | DATA | IMAGE |
| ID3001 | ARTICLE | — | IMAGE |
| | | | |

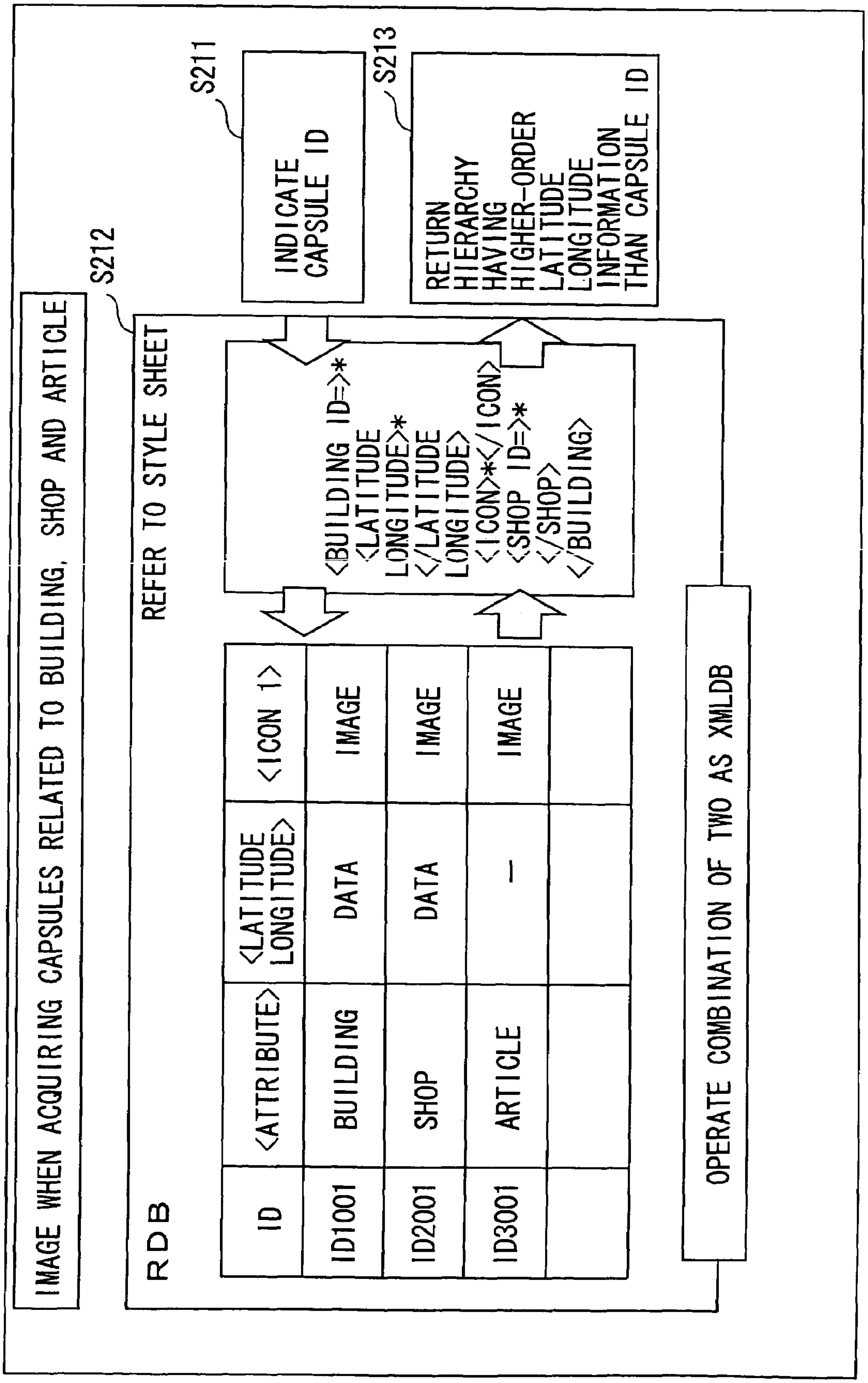

FIG. 37

IMAGE WHEN ACQUIRING CAPSULES RELATED TO BUILDING, SHOP AND ARTICLE

RDB

| ID | <ATTRIBUTE> | <LATITUDE LONGITUDE> | <ICON 1> |
|---|---|---|---|
| ID1001 | BUILDING | DATA | IMAGE |
| ID2001 | SHOP | DATA | IMAGE |
| ID3001 | ARTICLE | — | IMAGE |

REFER TO STYLE SHEET — S212

```
<BUILDING ID=>*
  <LATITUDE
   LONGITUDE>*
  </LATITUDE
   LONGITUDE>
  <ICON>*</ICON>
  <SHOP ID=>*
  </SHOP>
</BUILDING>
```

S211: INDICATE CAPSULE ID

S213: RETURN HIERARCHY HAVING HIGHER-ORDER LATITUDE LONGITUDE INFORMATION THAN CAPSULE ID

OPERATE COMBINATION OF TWO AS XMLDB

SERVER, INFORMATION PROVIDING METHOD AND RECORDING MEDIUM FOR DISTRIBUTING A TERMINAL WITH INFORMATION CONTAINING MENU AND LINK ARRANGED ON IMAGE

TECHNICAL FILED

The present invention relates to an information providing technology.

BACKGROUND ARTS

Owing to developments of the information communication technologies, various categories of information can be obtained via networks such as the Internet, etc. On the other hand, information providers such as advertisers of articles and services, who want to distribute the information, became able to easily originate their own advertising information. For example, the following patent document 1 is known as a method of providing the advertising information on the Internet.

Further, such pieces of information, which contain images, dynamic images and sounds (voices) as the case may be in addition to characters, are effective representations of intentions of the originators. Accordingly, a browsing party became able to select various categories of information through a visual sense, an acoustic sense, etc., and able to thus gather necessary pieces of information.

Those pieces of information are represented as an HTML (HyperText Markup Language)-scripted Web page. The Web page can be linked via URLs (Uniform Resource Locators) to other Web pages without any restrictions. Therefore, the Web page has such a merit that related pieces of information can be flexibly combined. Conversely, however, the Web page do not yet provide a sufficient scheme for such a case that highly related pieces of information desired to be treated as a bundle of integrated information.

Particularly for an increase in data size required for representing those pieces of information, there is not a sufficient rise in communication capacity of the network. Accordingly, when the browsing party obtains the information, there occurs inconvenience due to an imbalance between the data size and the communication capacity.

For example, on the occasion of searching for information on a certain shop and for articles handled at this shop via a Web page on the Internet, the browsing party needs to access, at first, a top page of this shop and to display the entire top page.

Namely, in the case of obtaining the information from the Web page, the browsing party, to begin with, must wait for completion of downloading an HTML file that scripts the entire top page (equivalent to one page) linking to that Web page. Then, when the top page is displayed, the browsing party traces the link displayed on this page, thus moving to a next page. In this case also, the browsing party, before tracing a next link, must wait till the entire page is displayed.

Then, there is a case where it might take a time long enough not to be worth using to display the Web page including a large-capacity content such as images, etc. Further, there rises a communication cost for such displaying. Moreover, there is a case in which a terminal having a small memory capacity might be incapable of displaying such a Web page itself.

Further, this type of Web page is designed generally on the assumption of displaying on a personal computer including a VGA (Video Graphics Array)-based display device. Therefore, the general type of Web page is difficult to display on a terminal having only a small-screen display device such as an on-vehicle device for car navigation, a PDA (Personal Digital (Data) Assistant), a cellular phone, a PHS (Personal Handy-phone System), etc.

For example, a process of describing in an electronic mail only URL of the Web page containing images, etc. having a large data size and delivering the mail to the information user, is conducted as a countermeasure.

For instance, a directory and a folder are known as a method of representing the information for dealing with related pieces of information in addition to the Web page described above. The directory and the folder are defined as a mechanism for storing the related information in a portion called a branch (or leaf) of a tree structure.

The directory and the folder are, however, insufficient in terms of a function of further distinguishing between pieces of information contained under one branch. For instance, when trying to extract the information contained under one branch, it follows that all pieces of information under this branch are captured irrespective of an intention of the user who operates.

Further, the directory and the folder do not provide a scheme for a function of maintaining, when extracting the information contained under one branch, relevancy to a high-order tree above this branch. For example, when the information contained in one single branch is copied to other areas, there vanishes a hierarchical relationship with the high-order information, which was established before copying.

Patent Document 1

Japanese Patent Application No. 2756483

DISCLOSURE OF THE INVENTION

The present invention was devised in view of the problems inherent in the prior arts described above. Namely, it is an object of the present invention to provide a technology that treats plural pieces of information related to each other as a bundle of integrated information group.

The present invention adopted the following means in order to solve the above problems. Namely, the present invention is a server for distributing an information content provided from an information provider to a user terminal, comprising means for accepting an access to the information content from the user terminal, means for separating the accessed information content into general information and mobile information, and mobile information providing means for getting the mobile information downloaded onto the accessing user terminal.

Herein, the mobile information connotes information that is downloaded onto a user terminal, accumulated on the user terminal and carried by a user together with the user terminal. According to the present invention, the information content can be separated into the mobile information and the general information without any restrictions.

Preferably, the server may further comprise means for prompting the information provider to set the information content to be provided.

Preferably, the server may further comprise related information linking means for linking plural pieces of mobile information by geographical position information, and getting these pieces of information as a mobile information group accumulated on the user terminal.

Preferably, the mobile information group may contain parent information having the geographical position information, and plural pieces of child information related to the geographical position, and the mobile information allocating means, when downloading the child information, may get the child information downloaded in linkage with the parent information onto the user terminal.

According to the present invention, when the user downloads the child information, the parent information containing the geographical position information to which the child information is related, is also downloaded. Accordingly, the plural pieces of information, which are geographically related, are set associated with each other and can be thus provided to the user.

Preferably, the server may further comprise means for getting the terminal to display user setting means for converting the general information into the mobile information.

Preferably, the mobile information may have a keyword, and the server may further comprise information searching means for searching for the mobile information on the basis of the keyword.

Further, the present invention is a server for distributing to a user terminal an information content provided by an information provider as an element information group in which one or more pieces of element information are linked together, comprising means for building up a hierarchical structure through an image between the pieces of element information, means for accepting an access to the image related to first element information from the user terminal, means for searching for second element information that forms the hierarchical structure with the first element information through the image, and means for distributing the information to the user terminal in a way that locates the second element information on the image.

According to the present invention, the first element information and the second element information build up the hierarchical structure via the image. The server, when the image is accessed, searches for the second element information that builds up the hierarchical structure with the first element information, and locates the second element information on this image, thus providing the information to the user.

Preferably, the server may further comprise means for adding information that geographically locates highest-order element information in the hierarchical structure, means for accepting an input of information related to the geographical position from the user terminal, means for searching for the element information located in a range of map information containing the geographical position, and means for distributing the information to the user terminal in a way that locates the retrieved element information on the map information.

According to the present invention, upon receiving the input of the information related to the geographical position, the map information is searched for, and the element information exiting in the range of the map information is also searched for, thus providing the information to the user.

Moreover, the present invention is a server for distributing to a user terminal an information content provided by an information provider as an element information group in which one or more pieces of element information are linked together, comprising means for adding, to the element information, reference information referring to a plurality of related images, means for adding, to the element information, selection information for selecting an image, accessed from on the user terminal, of the plurality of images, means for building up a hierarchical structure through the image between the pieces of element information, and means for presenting the reference information in conformity with the hierarchical structure.

According to the present invention, the element information group is distributed to the user terminal, and hence, when selecting the access target image on the user terminal, the selection information for selecting the image is displayed in conformity with the hierarchical structure among the pieces of element information. Therefore, even when referring to the element information extending over the plurality of hierarchies via the image, only the selection information can be traced throughout the plurality of hierarchies without referring to the image.

Further, the present invention may be a method for making a computer execute any one of the processes described above. Still further, the present invention may be a program for making the computer actualize any one of the functions described above. Yet further, the present invention may be a readable-by-computer recording medium recorded with such a program.

The readable-by-computer recording medium herein connotes recording mediums capable of storing information such as data, programs, etc. electrically, magnetically, optically and mechanically or by chemical action, which can be read by the computer. Among those recording mediums, the mediums demountable from the computer are, e.g., a floppy disk (flexible disk), a magneto-optic disk, a CD-ROM, a CD-R/W, a DVD, a DAT, an 8 mm tape, a memory card, etc.

Further, the recording mediums fixed within the computer are exemplified such as a hard disk, a ROM (Read Only Memory) and so on.

As described above, according to the present invention, the plural pieces of information, which are related to each other, are bundled into the integrated information group and can thus be treated.

BRIEF DESCRIPTION OF THE DRAWINGS

FIG. 5 is a diagram of a data structure of an icon information database;

FIG. 6 is a diagram of a data structure of an attribute information database;

FIG. 7 is a diagram of a data structure of a menu/link information database;

FIG. 8 is a diagram of a data structure of a position information database;

FIG. 28 shows an example of data of the information capsule according to a fifth embodiment of the present invention;

FIG. 31 shows an example of a MyCapsule management table;

FIG. 35 shows an example of a shop database batch management screen;

FIG. 37 is a diagram showing an outline of processing when acquiring the capsules related to the building, the shop and the article.

BEST MODE FOR CARRYING OUT THE INVENTION

Preferred embodiments of the present invention will hereinafter be described with reference to the drawings.

First Embodiment

An information system according to a first embodiment of the present invention will be explained with reference to the drawings in FIGS. 1 through 15.

<System Architecture>

Figure 1:
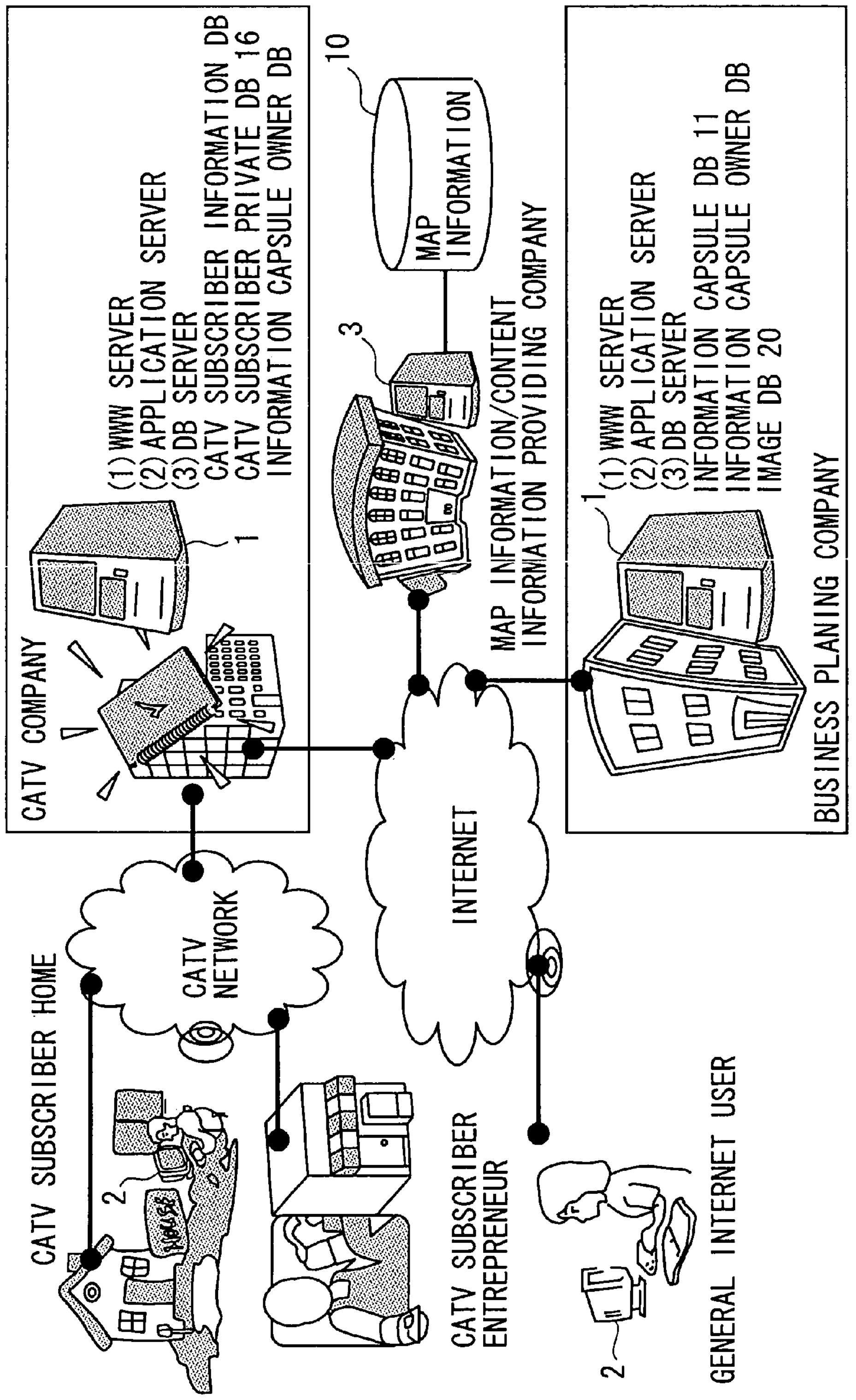
FIG. 1 is a view of a system architecture of a whole information system according to a first embodiment of the present invention.

FIG. 1 shows a view of a system architecture of the present information system. This system is configured of a server 1 operated by a service providing company such as a cable TV company, a business planing company, etc., a map information server 3 operated by an information providing company for providing map information and content information, and a terminal 2 of an information user who accesses the server 1 via a network such as a cable TV network, the Internet and so on.

Herein, the network connotes, for example, the Internet, the cable TV network, a wired or wireless or optical communication network, etc.

The server 1 executes a variety of information processing programs and thus provides various categories of services to the users (including both of information providers and the information users) via the Internet, the cable TV network, etc. The server 1 is classified, depending on functions provided by the server, into a WWW (World Wide Web) server, an application server and a database server. According to the present embodiment, such a variety of servers are generically termed the server 1.

The single server 1 may provide such functions, and the servers 1 that are different according to the functions may also be provided. The server 1 is a general type of computer including a CPU, a memory, a hard disk, a communication interface and so on. These components and operations thereof are widely known, and hence their explanations are omitted.

In the present information system, the server 1 provides the information user with information called an information capsule (corresponding to element information). The server 1 serving as the database server has various types of databases such as an information capsule database 11 stored with such pieces of information capsules, an information capsule owner database recorded with owners of the respective information capsules, a subscriber information database (FIG. 1 shows, e.g., a CATV subscriber DB as a cable TV network subscriber database) recorded with users of services such as the cable TV, etc., a private database 16 as a private storage area for every subscriber, an image database 20 stored with images of facilities and shops that are associated with the information capsules, and so forth. Those databases may, however, be managed by the single server 1 or may also be managed in distribution by a plurality of servers 1.

The map information server 3 has a map information database 10, and provides map information about a requested spot by request from the server 1. The map information is raster data developed over a rectangular area and distinguished by latitude and longitude of a diagonal position. GIS (Geographical Information System) is widely known as an information system using this type of map information. Hardware components of the map information server 3 are the same as the server 1 has.

The terminal 2 utilized by the information user includes a CPU, a memory, a hard disk, a display device, operation units (such as a keyboard, a pointing device, a remote controller, etc.), a communication unit and so on.

The terminal 2 is a device having a communication function that communicates with any one of the networks given above and capable of digital data processing by the CPU or the like. The terminal 2 is, for example, a personal computer, PDA (Personal Digital (Data) Assistant), a car navigation system (an on-vehicle system), a receiver (a set-top box) for the cable television and satellite broadcasting, a digital TV receiver, one of devices known as personal digital electronics, a cellular phone, a PHS (Personal Handyphone System) and so on.

The information user accesses the server 1 via the network by use of such a type of terminal 2, and requests the server 1 to download a desired piece of information capsule.

The server 1 edits the information capsule requested from on the terminal 2 and downloads the information capsule into the terminal 2. The downloaded information capsule is displayed on the display device of the terminal 2.

The information capsule according to the present embodiment contains links to other related information capsules. Therefore, the information user can trace the links further to the related information capsules from the displayed information capsule.

Note that in this case a content of the information capsule (mobile information) may actually be downloaded into and accumulated on the terminal 2. In an actual use, however, the information capsule is not necessarily stored on the terminal 2. For example, the server side is provided with a dedicated-to-user area, and the information capsule may be registered in this area. The user may refer to the dedicated-to-user area as the necessity may arise, and may get the information capsule displayed on the terminal 2.

<Concept of Information Capsule>

Figure 2:
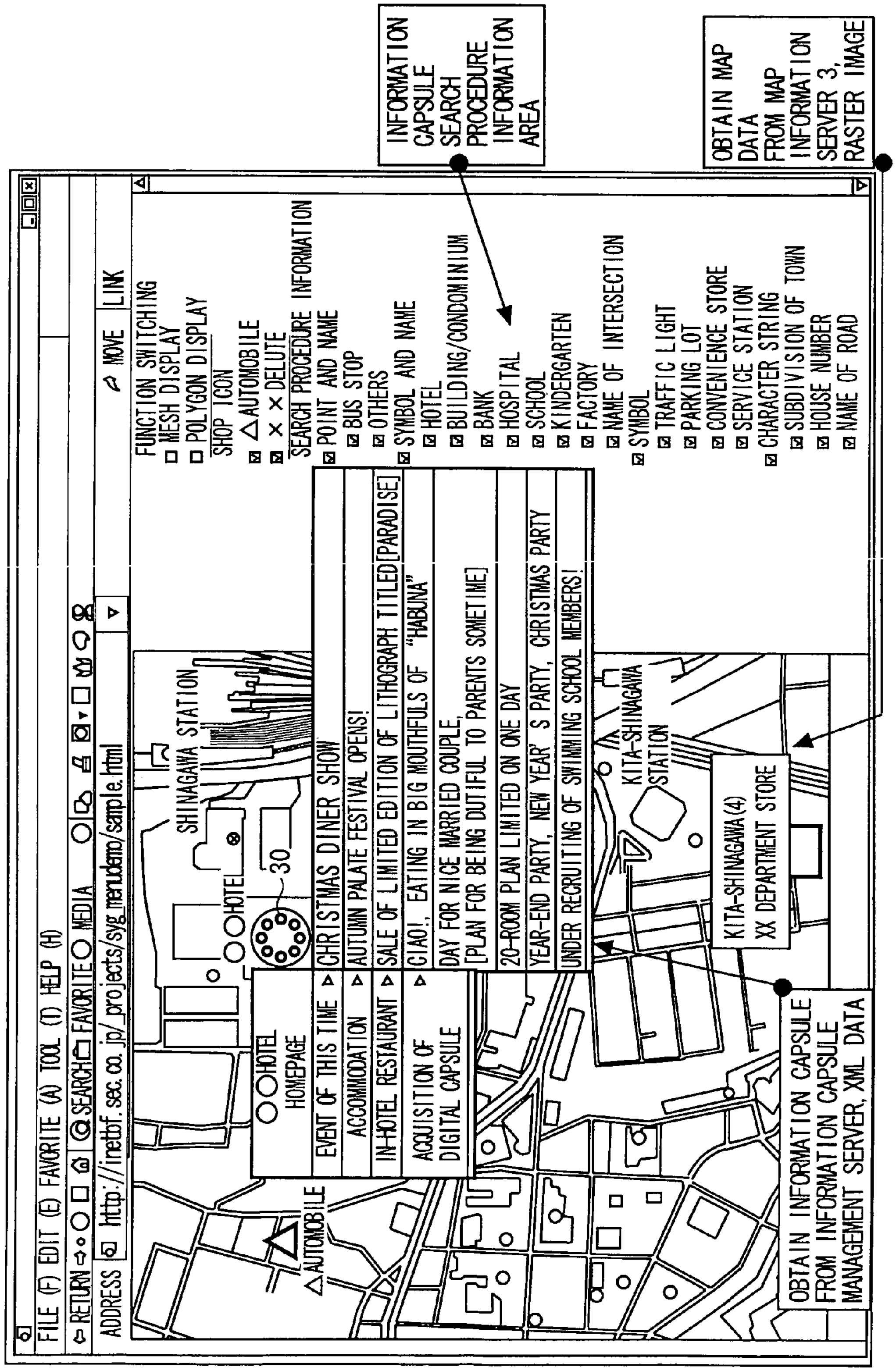
FIG. 2 is a view of an image showing how an information capsule is superimposed on map data.

FIG. 2 illustrates an image of map data on which the information capsule is superimposed. A configuration of the information capsule is formed of an icon displayed against a background image and menus (which are typically pull-down menus or pop-up menus) displayed in the vicinity of the icon.

The information capsule contains position information based on the background image and information for displaying the menus. In FIG. 2, the map is employed as background image data. Then, there is displayed an icon (e.g., an icon 30 of the Hotel X) of the information capsule that is position within a range of this map.

When the information user moves an on-screen cursor onto this icon by using an unillustrated operating unit, the information capsule is specified by the icon. Then, the menu contained in this information capsule is displayed. Thus, an operation of placing the cursor onto an object such as the icon, the menu, etc. is expressed as 'putting a focus' or termed 'focusing'. Moreover, when the information user focuses an item in the menu, a low-order menu appended to this item is displayed.

Further, the present information system provides, together with the display of the information capsule, a filtering means called search procedure information. As shown in FIG. 2, category items of the information capsule are displayed together with checkboxes in a search procedure information area for displaying the search procedure information. The category items are referred to as the search procedure information.

The search procedure information is information for designating names of facilities such as a bus stop, a building, a condominium, a hotel, a bank, etc. and designating a spot and a district as by subdivision of a town, a street number, a name of road, etc. The present information system selects an information capsule belonging to a category designated by the search procedure information, and displays this information capsule to the information user.

Figure 3:
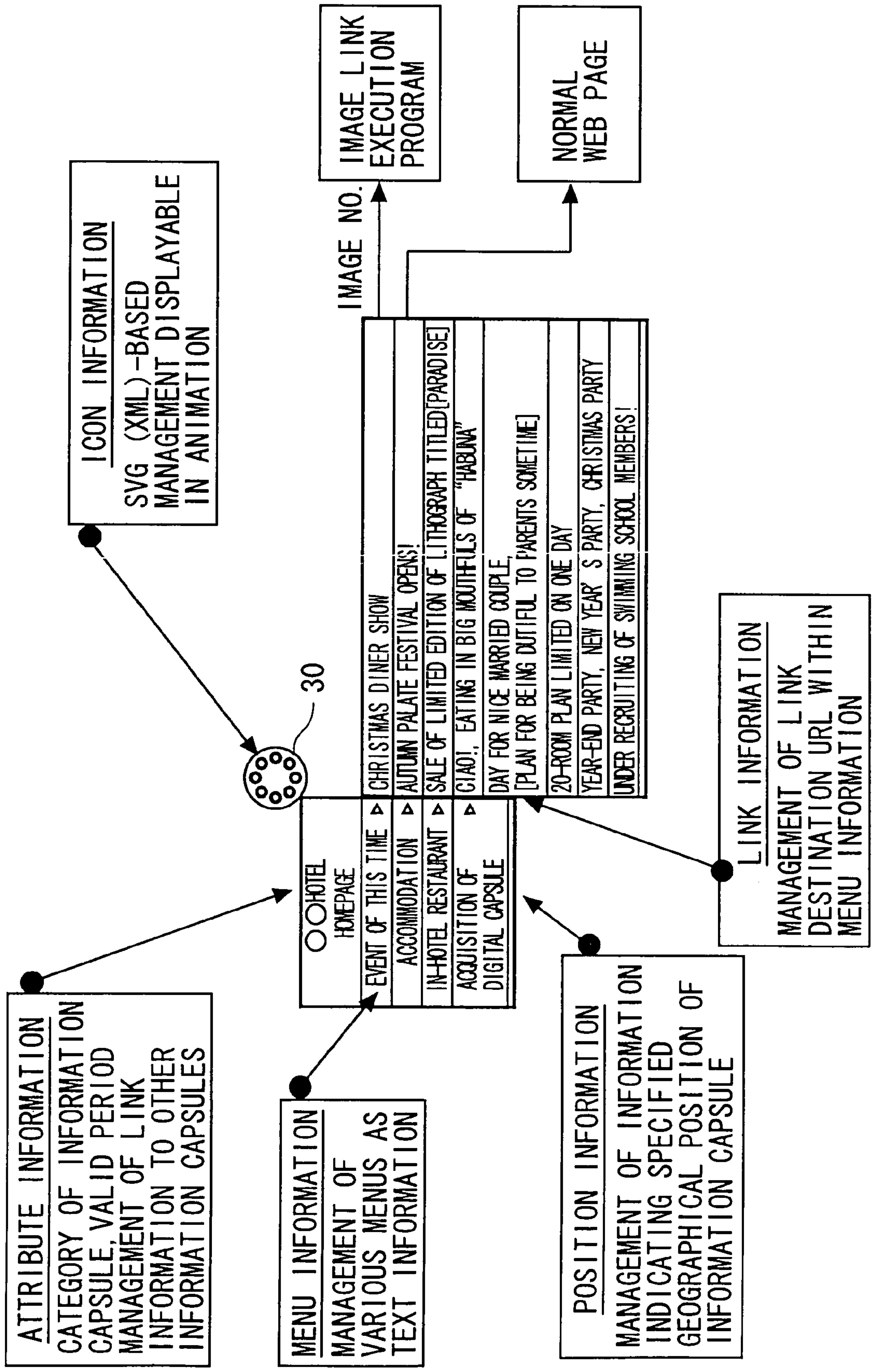
FIG. 3 is a diagram of an image of a shop capsule.

FIG. 3 illustrates an image of a shop capsule by way of one example of the information capsule. As shown in FIG. 3, the information capsule contains icon information, attribute information, menu information, link information and position information.

The icon information is information that forms a mark (which is, for example, the icon 30 in FIG. 3) for displaying the information capsule on the screen. The icon information consists of an image, characters, character strings, etc. The icon information is described in an SVF (Scalable Vector Graphics) format in the present embodiment, and can also express animation.

The attribute information consists of, for example, a category of the information capsule, a valid period and link information to other information capsules.

The menu information is data for displaying the menu contained in the information capsule (wherein the menu information corresponds to selection information). The link information is stored inside the menu information, and information about a link destination when the menu is selected is set in the link information (wherein the link information corresponds to reference information).

In the present information system, the link destination is a program for executing a process named "image link" or is a normal Web page. The server 1 searches, as to the image link, for an image designated by a parameter "image No." and for other information capsules superimposed on this image, and gets the image and other information capsules displayed on the terminal 2 of the information user. This image link is actualized by, for instance, CGI (Common Gateway Interface) or JSPs (Java Sever Pages).

For example, according to JSPs, JavaScript for executing the image link based on Java language is embedded in an XML (eXtensible Markup Language) file that describes the Web page and is executed in response to a request (a menu selection) given from a client, thereby executing a search for the designated image and a selection of the information capsule superimposed on this image.

Further, when the link destination is the normal Web page, this Web page is displayed on the terminal 2. It is to be noted that the menu information and the link information are assembled together, which may also be called menu/link information.

The position information specifies a position of the information capsule on the background image. For instance, when the background image is a map, the position information is stored with latitudes and longitudes encompassed within this map. Moreover, when the background image is other than the map, for example, an image like a layout of a building, the position information is stored with image No. For identifying this image and coordinates indicating a position within the image.

Thus, the information capsule is formed of the map (background image), the icon, the attribute, the menu/link information and the position, and is dealt with in distinction from the general Web page.

Figure 4:
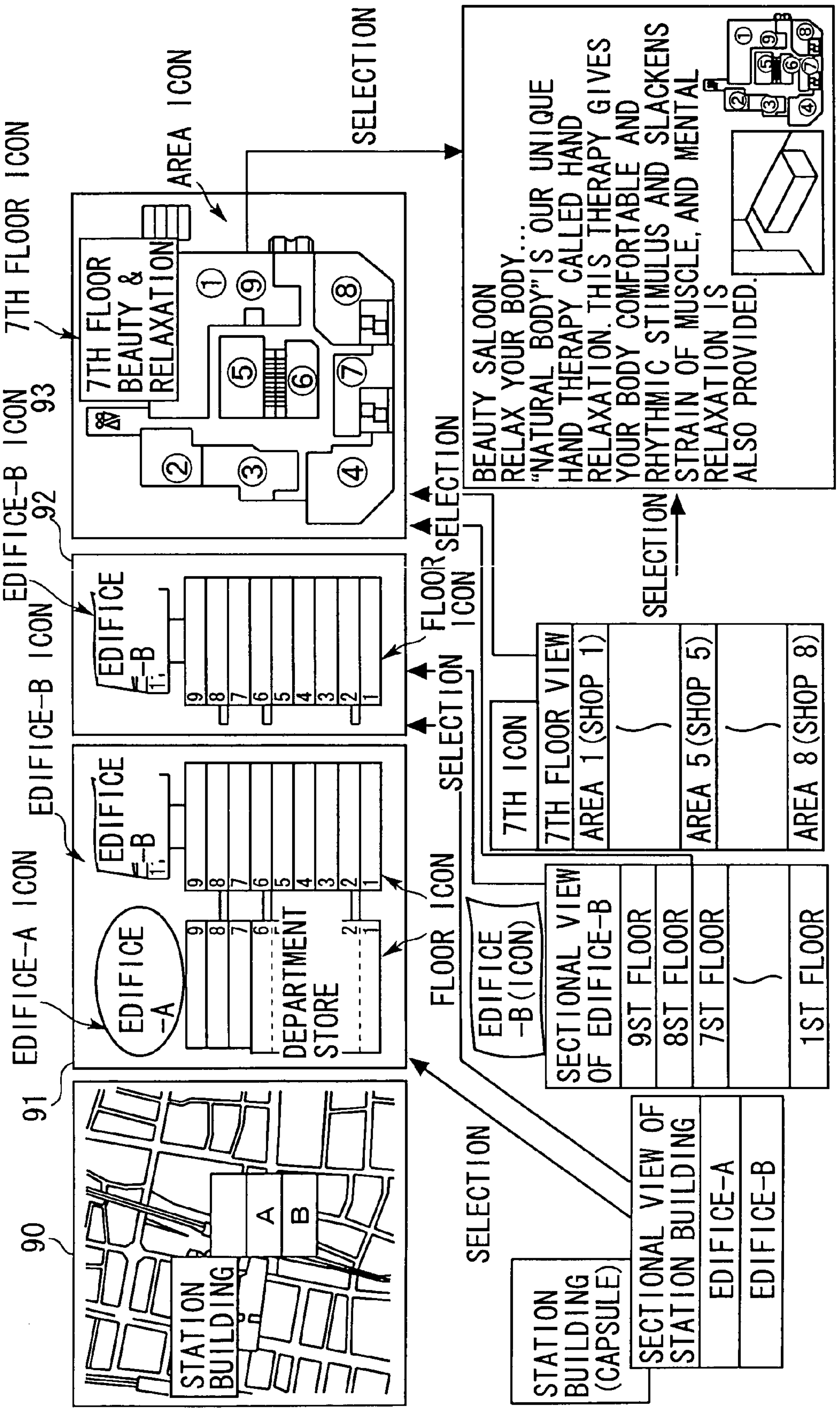
FIG. 4 is a diagram of an image of an image link built up by a plurality of information capsules.

FIG. 4 shows an image of an image link configured by a plurality of information capsules. A station building capsule indicated by a character string 'station building' is displayed on a map 90 depicted in an upper left area in FIG. 4. It is assumed that this station building be constructed of, e.g., petit edifices A and B (which will hereinafter be simply called edifices A and B). The station building capsule contains menu selection items (a sectional view of the station building, i.e., the edifices A and B) corresponding to a structure of the station building. When the information user focuses an icon of the station building on the map, a menu of the station building capsule is displayed.

Now, supposing that the information user selects the sectional view of the station building from the station building capsule menu, a station building sectional view 91 and icons of information capsules (e.g., first through ninth floor capsules of the edifice A, first through ninth floor capsules of the edifice B, etc.) contained in this sectional view, are displayed on the terminal 2 of the information user. Thus, a data structure for searching, via the images, for the information capsules disposed within the images of the map, the building and part of the building, is called the image link (corresponding to a hierarchical structure via images).

In this case, the icon (which is referred to as, e.g., an edifice-A icon) of the information capsule (which is called, e.g., an edifice-A capsule) associated with the edifice A, may be disposed in the section of the station building. The edifice-A icon contains menu selection items (e.g., a sectional view of the edifice A and the respective floors of the edifice A) corresponding to the structure of the edifice A. Similarly, the icon (which is referred to as, e.g., an edifice-B icon) of the information capsule (which is called, e.g., an edifice-B capsule) associated with the edifice B, may be disposed in the section of the station building. The edifice-B icon contains menu selection items (e.g., a sectional view of the edifice B and the respective floors of the edifice B) corresponding to the structure of the edifice B.

Moreover, when the information user selects, for instance, the edifice B from the menu of the station building, there are displayed a edifice-B sectional view 92 and icons of the information capsules (e.g., first through ninth floor capsules of the edifice B, etc.) contained in the sectional view of the edifice B.

When the information user puts a focus on the seventh floor capsule (indicated by a seventh floor icon in FIG. 4) of the edifice B of the station building, a menu (a view of the seventh floor of the edifice B, an area 1 (shop 1) through an area 8 (shop 8), etc.) contained in this capsule is displayed.

When the information user selects, for example, the view of the seventh floor of the edifice B from the menu, the view of the seventh floor is displayed, and the information capsules (e.g., the areas 1 through 8) contained in this floor view are displayed. Shops are located in the individual areas. Accordingly, the station building edifice-B seventh floor capsule links to a shop capsule associated to each area, e.g., an information capsule, etc. of a beauty saloon in the area 5.

Therefore, when the information user selects the area 5 from the menu of the edifice-B seventh floor capsule, there are displayed a floor view of the area 5 and the information capsule of the beauty saloon conducting a business in the area 5. Note that the link from within the menu may also be set so that a Web page is displayed in place of displaying the image and the information capsule by the selection from the menu.

Further, an information capsule retaining article-by-article information of the shop may also be linked to within the shop information capsule. Still further, a maker's information capsule may also be link to the article information capsule. As a result, the maker can utilize the information capsule as a means for monitoring consumer reactions to the articles and the maker itself.

The thus-established image link or the link to the Web page builds up the hierarchical structure including the geographical position, the building, the floors, the areas and the shops. This hierarchical structure is called a semantic network.

It should be noted that the process of searching for the low-order information capsules by tracing the image link is compiled by, for instance, CGI, JSPs in the present information system. Moreover, the process of tracing the link to the low-order information capsules or the Web page from the menu is similar to the process of the normal Web server with HTTP.

<Data Structure>

As stated in the description in FIG. 3, the information capsule consists of the icon information, the attribute information, the menu/link information and the position information. These pieces of information are stored on an icon information database 12, an attribute information database 13, a menu/link information database 14 and a position information database 15 of the server 1. These databases are generically called an information capsule database 11. Structures of these databases will hereinafter be illustrated.

FIG. 5 is a diagram of a data structure of the icon information database 12. The icon information database 12 is a database for managing the image information configuring the icons. The icon represents a visual image of helping recognize contents of the information capsule. The icon information database 12 consists of an information capsule ID and one or more icon file names.

The information capsule ID is a piece of information for uniquely identifying the information capsule. The information capsule ID is structured of a code of an entrepreneur (a common carrier) that provides services of CATV, ASP (Application Service Provider), etc., a subscriber code to the entrepreneur, and a serial number. Note that the information capsule ID may be structured of URL (Uniform Resource Locator).

The icon file name is a file name of a file for storing the icon images. The icon image may, however, contain a character string. Each of records of the icon information database 12 retains one or more icon file names associated with icon types. For example, the first icon file name serves for a standard icon, the second icon file name serves for a small icon, the third icon file name serves for an intermediate icon, and so on.

The icon type connotes herein a type of the icon contained in one information capsule, and, for instance, there are prepared the standard icon, the small icon, the intermediate icon, a large icon, a banner type, a list format, etc.

FIG. 6 shows a diagram of a data structure of the attribute information database 13. The attribute information database 13 is a database in which to define various categories of attributes of the information capsules. A table shown in FIG. 6 corresponds to one record of the attribute information database 13. The record contains respective fields such as an information capsule ID, an information capsule name, an attribute, a valid period and capsule link information.

The information capsule ID is the same as what has been explained in the icon information database 12. The information capsule name contains a name definition of this information capsule. The information capsule name prepares names that are different according to a plurality of Internet access devices utilized by the information users. A name length is ruled corresponding to a resource of each individual information device such as 'Station Building for PC' for a personal computer, 'Station Building' for the cellular phone or the PHS, and so forth. Then, it is managed depending on a storage location which information device the individual name is associated with. For instance, the first name is associated with the personal computer, the second name is associated with the cellular phone, and so on.

The attribute is a code for defining a category of each information capsule. Categories of the buildings and the shops, which are associated with the information capsules, are set as the attributes. The attribute codes are ruled by systems such as 1: Private practice doctor, 2: Hospital, 3: Restaurant, 4: Convenience store, and so forth.

The valid period is a valid period of the information capsule. The valid period contains an effective date (year/month/day) and an expiration date (year/month/day). The information capsule, after being created, receives accessibility from on the server 1, ranging from the effective date up to the expiration date.

In the present information system however, the setting of the valid period may be omitted. The information capsule with no setting of any valid period remains valid limitlessly on the server 1 unless explicitly deleted.

The capsule link information is an information capsule ID of the information capsule that is of a higher-order by one than each information capsule. The capsule link information defines a hierarchical relationship between the capsule concerned and the high-order information capsule.

FIG. 7 shows a diagram of a data structure of the menu/link information database 14. The menu/link information database 14 defines a menu belonging to the individual information capsule and a link destination getting a link established from the menu. The menus having a plurality of hierarchies (three hierarchies at the maximum) can be defined in the information capsule in the same way as the general pull-down menus or the pop-up menus can be.

The menu/link information database 14 consists of an information capsule ID, menu hierarchical information, and first hierarchical information, second hierarchical information and third hierarchical information. The menu hierarchical information is the number of menu hierarchies.

Menu items of the first hierarchy are defined in the first hierarchical information. The first hierarchical information contains a menu count, a menu text, menu-text-by-menu-text link information and a pointer to the second hierarchical information. The menu count is the number of menu items.

The menu texts are character strings representing the respective menu items. In the present embodiment, the menu texts prepare names that are different according to the plurality of Internet access devices utilized by the information users. This is similar to the icon file names in the icon information database and with the information capsule names in the attribute information database. Then, the link information specifying the link destination is retained as the menu-text-by-menu-text link information for every menu text according to each application.

Two types of information are selectively stored in the menu-text-by-menu-text link information. The first type of information is URL specifying a Web page as the link destination. Further, the second type of information is URL to an application program that executes the image link, and a parameter transferred to the application program.

A process in such a case that URL to the Web page is selected from the menu, is the same as a process (HTTP, HyperText Transfer Protocol) executed between a normal Browser and a web server.

When the image link is selected from the menu, a piece of information (image No.) that specifies the image used for the image link is transferred to this application program. The application program searches for an image file on the basis of the thus-transferred image No., and further searches for an information capsule contained in that image. Then, the application program performs editing to superimpose the information capsule contained in the image, and sends the edited data back to the terminal 2.

The pointer to the second hierarchical information designates, for the respective menu items defined in the first hierarchical information, an address of the second hierarchical information that defines the menu of the second hierarchy belonging to the low-order thereunder.

The second hierarchical information is defined next to the first hierarchical information. The second hierarchical information gets a link established via the pointer to the second hierarchical information from each of the menu items of the first hierarchical information. Further, the third hierarchical information is defined for the second hierarchical information.

FIG. 8 shows a diagram of a data structure of the position information database 15. The position information database 15 has definitions of positions of the information capsules against the background image. A table shown in FIG. 8 corresponds to one record of the position information database 15. The record contains respective fields such as an information capsule ID, a position category and position information.

The information capsule ID is similar to that of the icon information database 12. A category of the information for specifying the position is recorded in the position category. For example, when the position category is 1, a map is designated. When the position category is 2, an image is designated. When the position category is 3, nothing is designated, and so forth.

The position information contains, when the position category is the map, information indicating a latitude and a longitude. Further, when the position category is the image, there are designated an image No. that specifies a background image and a position within the background image by a relative number of dots.

The image No. is information serving as a search key for searching for the image on the image database 20. A coordinate system is that, for example, an origin is set in an upper left position of the background image, an X-axis is given in a right direction, while a Y-axis is given in a downward direction.

Further, when none of the position categories are designated, the position information is blanked.

<Operation>

Figure 9:
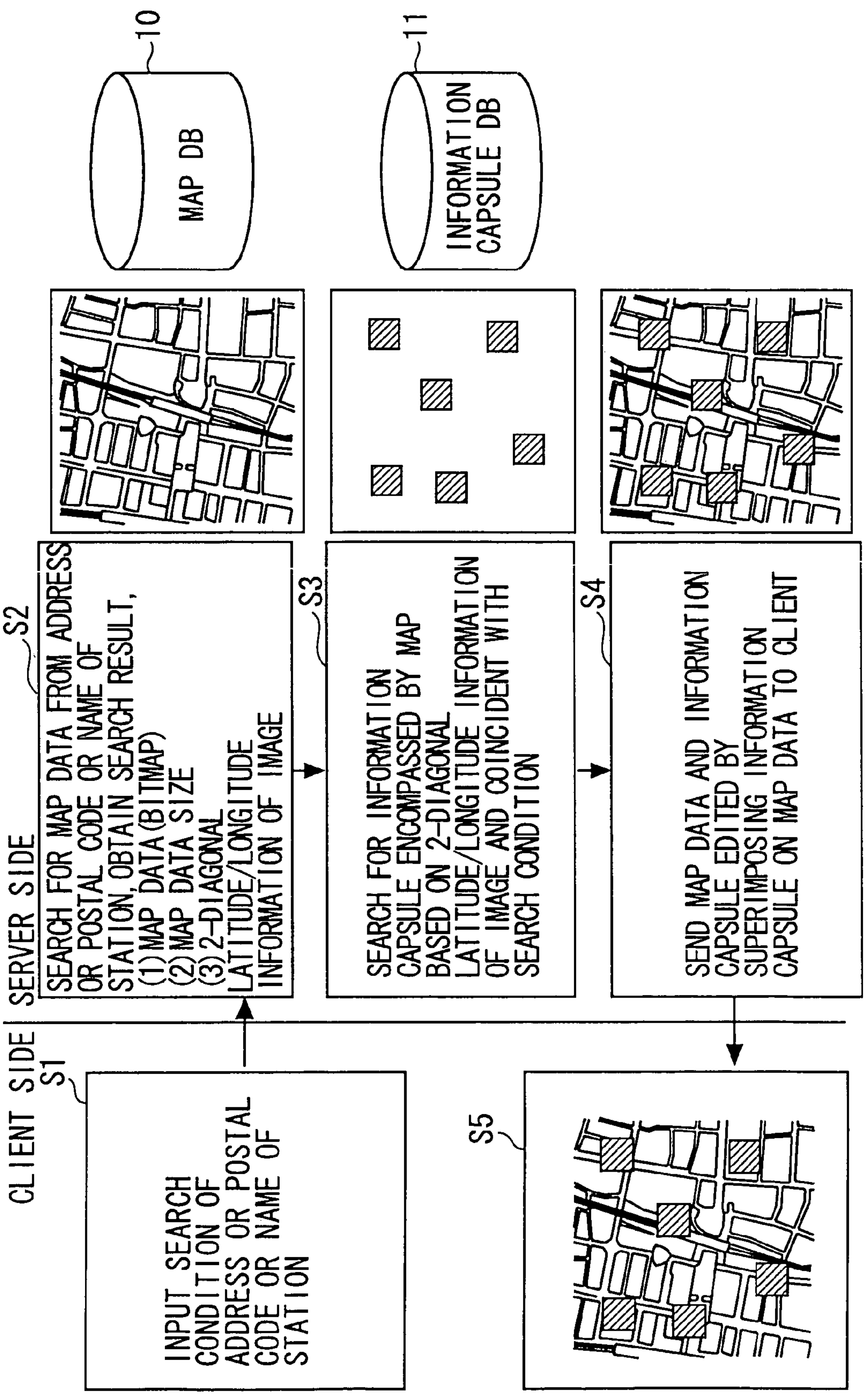
FIG. 9 is a diagram showing a processing flow of a map data acquisition process.

The following is an explanation of the application program executed by the CPU of the server 1 and of the process actualized by Browser on the terminal 2 (which will hereinafter be simply called Browser) of the information user. FIG. 9 is a diagram showing a processing flow of a map data acquisition process.

In this process, at first, the information user inputs pieces of information such as an address, a postal code, a name of the station, etc. of a district which the information user wants to obtain information about, and a search condition for specifying this information onto an input screen of a Website displayed on the terminal 2 (S1). The search condition herein connotes a service category, an article category, etc. The Browser on the terminal 2 transmits the inputted information to the server 1.

The server 1 gets the map data searched for through the map database 10 on the basis of the transmitted information such as the address, the postal code or the name of the station, etc., thereby obtaining a search result (S2). The map data is structured of a bitmap-formatted image, a map data size indicating a lengthwise distance and a crosswise distance of this image, and latitude/longitude information of two diagonal positions (e.g., an upper left point and a lower right point).

Next, the server 1 searches the information capsule database 11 for an information capsule contained in the map concerned and coincident with the search condition on the basis of the latitude/longitude information of the two diagonal positions (S3). To be specific, the server 1 acquires the information capsule of which the latitude and the longitude are encompassed by the map range by searching the position information database 8.

Subsequently, the server 1 performs editing so as to superimpose the retrieved information capsule on the map data and sends the edited data to the terminal 2 (client) (S4). This edited data is described in, e.g., XML (eXtensible Markup Language). The terminal 2 displays the information capsule on the received map (S5).

Figure 10:
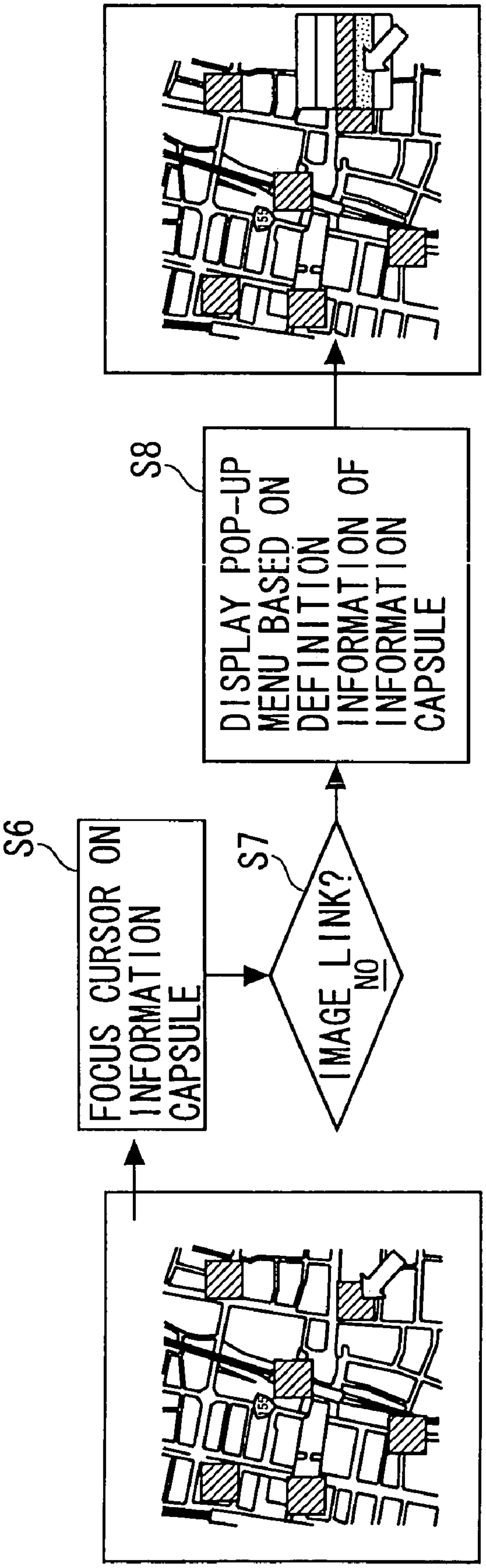
FIG. 10 is a diagram (1) showing a processing flow of the information capsule having no image link.
Figure 11:
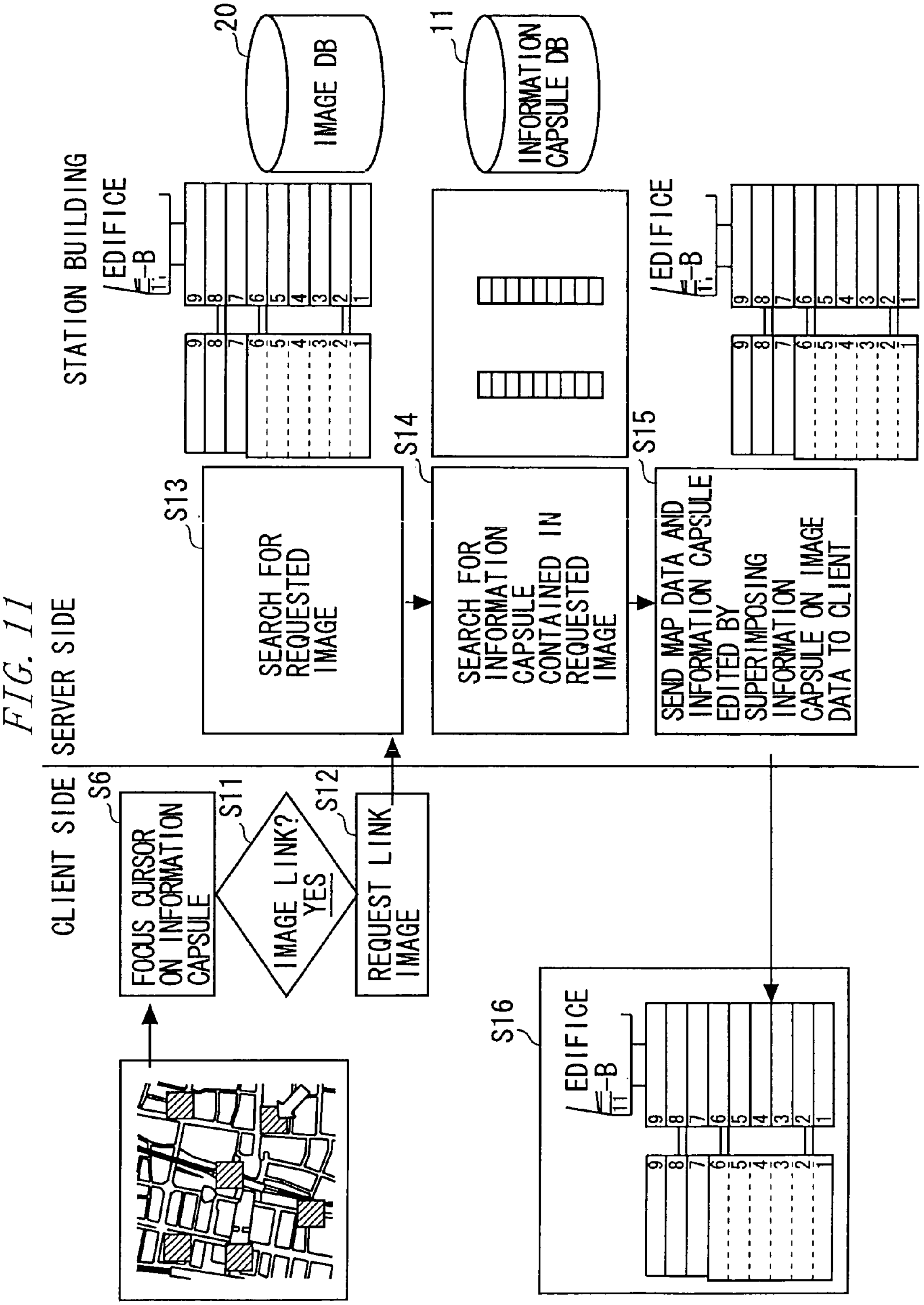
FIG. 11 is a diagram (1) showing a processing flow of the information capsule having the image link.
Figure 12:
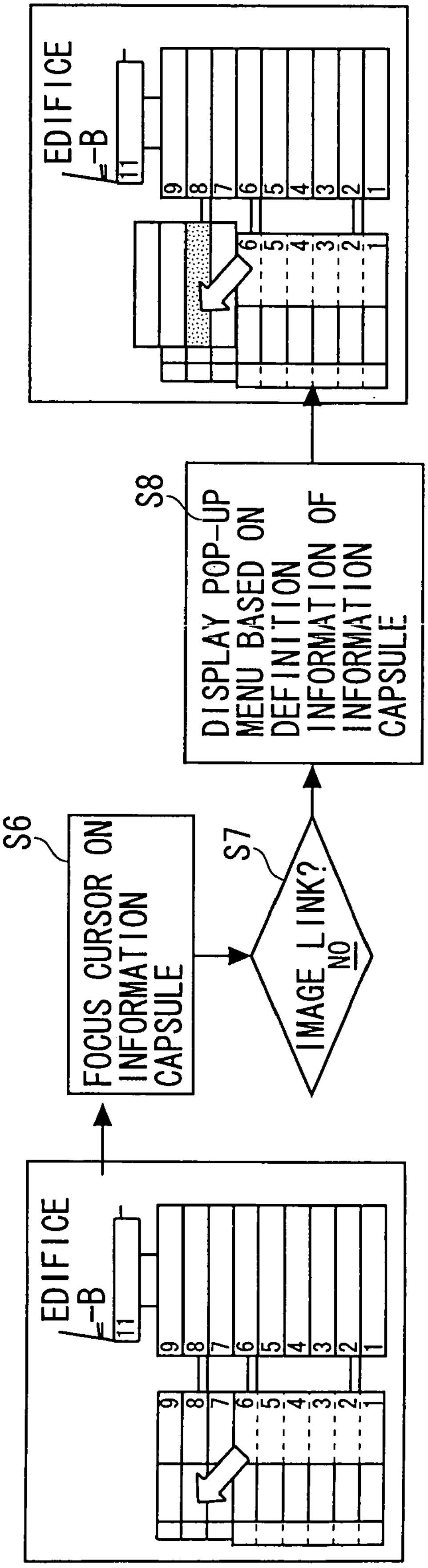
FIG. 12 is a diagram (2) showing a processing flow of the information capsule having no image link.
Figure 13:
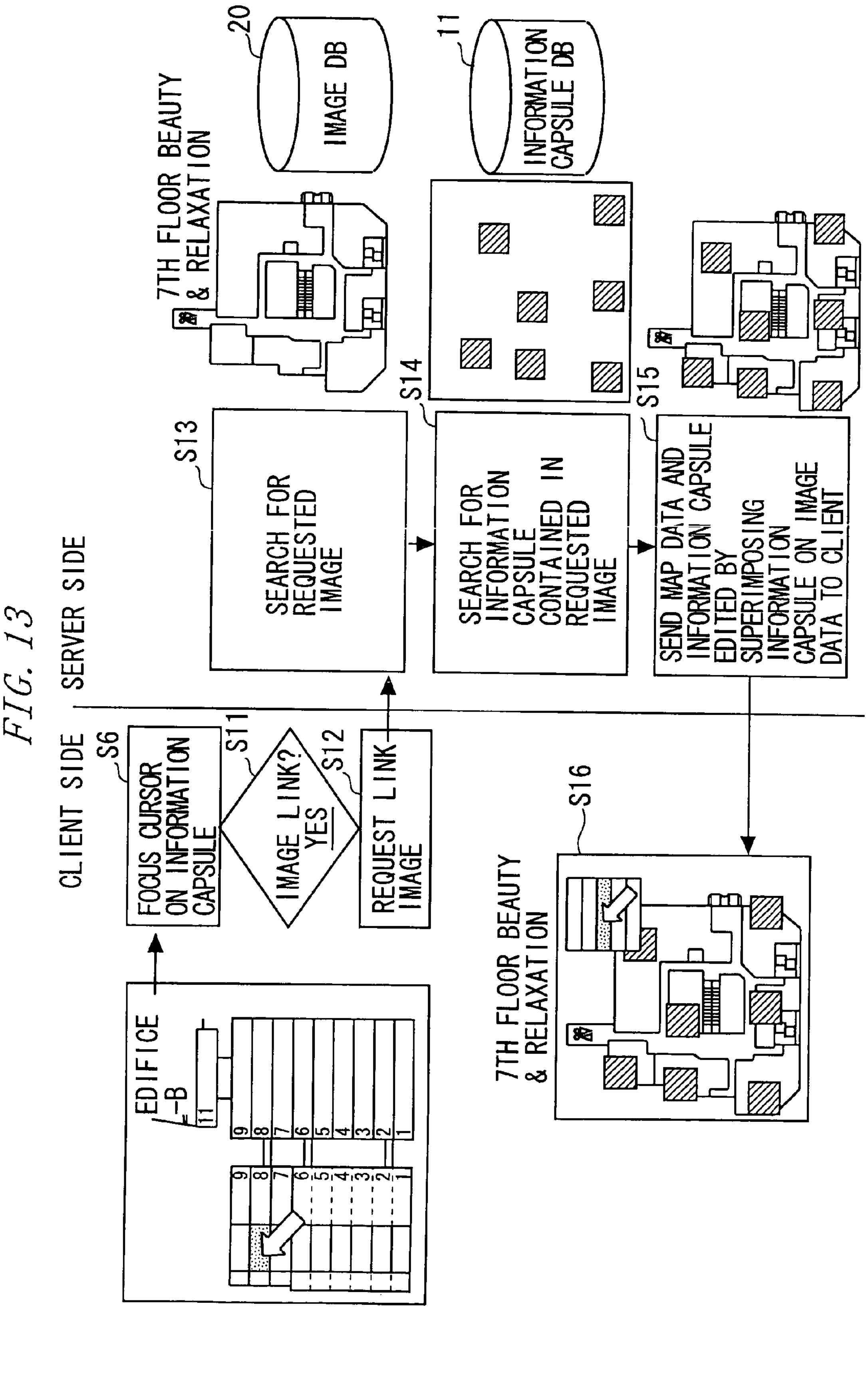
FIG. 13 is a diagram (2) showing a processing flow of the information capsule having the image link.

FIGS. 10 and 12 are diagrams each showing a processing flow of the information capsule having no image link. Further, FIGS. 11 and 13 are diagrams each showing a processing flow of the information capsule having the image link. The following is a description of a result of the operation shown in FIG. 9 and of a process with respect to the information capsule displayed on the terminal 2.

In this process, for instance, the information user operates the operation unit on the terminal 2, and focuses the cursor upon the information capsule on the map (S6). For example, the information user puts the focus on the information capsule of the station building.

Then, the Browser judges whether the focused information capsule has the image link or not (S7). If there is no image link, the Browser has the pop-up menu displayed pursuant to the definition information of the information capsule (S8).

Further, as shown in FIG. 11, if the focused information capsule has the image link (S11), the Browser requests the server 1 for a link image (S12). Herein, the request for the link image connotes a request for a background image and a low-order information capsule superimposed on this image. Upon this request, an image No. of the background image is sent to the application program of the server 1.

Then, the server 1 starts up the designated application program (JSP, CGI, etc.), and transfers the image No. as a parameter. The application program on the server 1 searches the image database 20 for the background image (e.g., a sectional view of the station building) for the requested information capsule (S13). The image database 20 is a database for managing the background image for the information capsule, and retains the image data with the image No. serving as a key.

Next, the server 1 searches the information capsule database 11 for the information capsule contained in the requested background image (the sectional view of the station building) (S14). Namely, the server 1 searches the position information database 15 for the information capsule in which the aforementioned image No. serves as an image No. of the background image.

Then, the server 1 performs editing in a way that superimposes the retrieved information capsule on the image data of the background image, and sends the edited data to the terminal 2 (client). Upon receiving this edited data, the terminal 2 executes displaying in a way that superimposes the information capsule on the background image.

FIGS. 12 and 13 show processes of the information system in a case where the information user traces the image link. These processes are the same as the processes in FIGS. 10 and 11 except a point that the background image is not the map but a normal image file.

Specifically, the information user operates the operation unit on the terminal 2 and focuses the cursor upon the information capsule on within the background image (S6). For example, the information user puts the focus on the information capsule of the seventh floor of the edifice-B within the sectional view of the station building.

Then, the Browser judges whether the focused information capsule has the image link or not (S7). If there is no image link, the Browser has the pop-up menu displayed pursuant to the definition information of the information capsule (S8).

Further, as shown in FIG. 13, if the focused information capsule has the image link (S11), the Browser requests the server 1 for the link image (S12). Upon this request, an image No. of the background image is sent to the application program of the server 1.

Then, the server 1 starts up the designated application program (JSP, CGI, etc.), and transfers the image No. as a parameter. The application program on the server 1 searches the image database 20 for the background image (e.g., a floor view of the seventh floor of the station building) for the requested information capsule (S13).

Next, the server 1 searches the information capsule database 11 for the information capsule contained in the requested background image (the floor view of the seventh floor of the station building) (S14). Then, the server 1 performs editing in a way that superimposes the retrieved information capsule on the image data of the background image, and sends the edited data to the terminal 2 (client). With this edited data received, the terminal 2 executes the display in a way that superimposes the information capsule on the background image.

Figure 14:
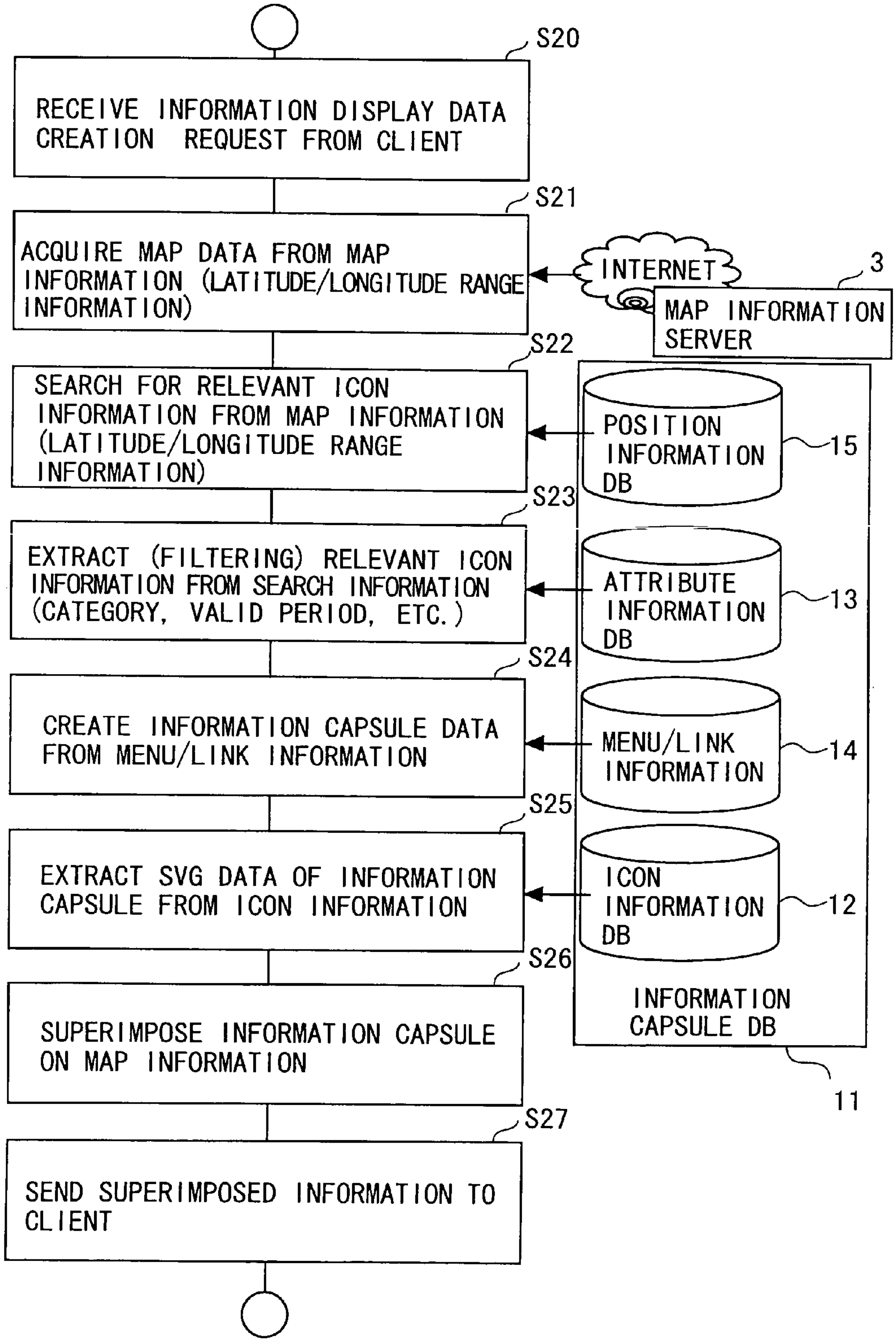
FIG. 14 is a flowchart showing a download process of the information capsule on a server 1.

FIG. 14 shows a download process of the information capsule in the server 1. In this process, to start with, the server 1 receives an information display data creation request (which contains the information indicating a point and a search condition) from the terminal 2 (client) (S20).

Then, the server 1 acquires the map data from the map information database 10 of the map information server 3 connected via the Internet (S21).

Next, the server 1 searches the position information database 15 for an information capsule (the information capsule may also be called icon information) belonging to a range defined by range information (of a longitude and a latitude) of the map data (S22).

Subsequently, the server 1 extracts (filtering) the relevant information capsule on the basis of the search condition designated from on the terminal 2 such as a category of the information capsule, a valid period, etc. (S23).

Next, the server 1 creates information capsule data from the menu/link information (S24). Further, the server 1 extracts SVG data of the information capsule from the icon information database (S25).

Subsequently, the server 1 superimposes the information capsule on the map information (S26). Then, the server 1 transmits the map information and the information capsule, which have been superimposed together, to the terminal 2 (client) (S27).

Figure 15:
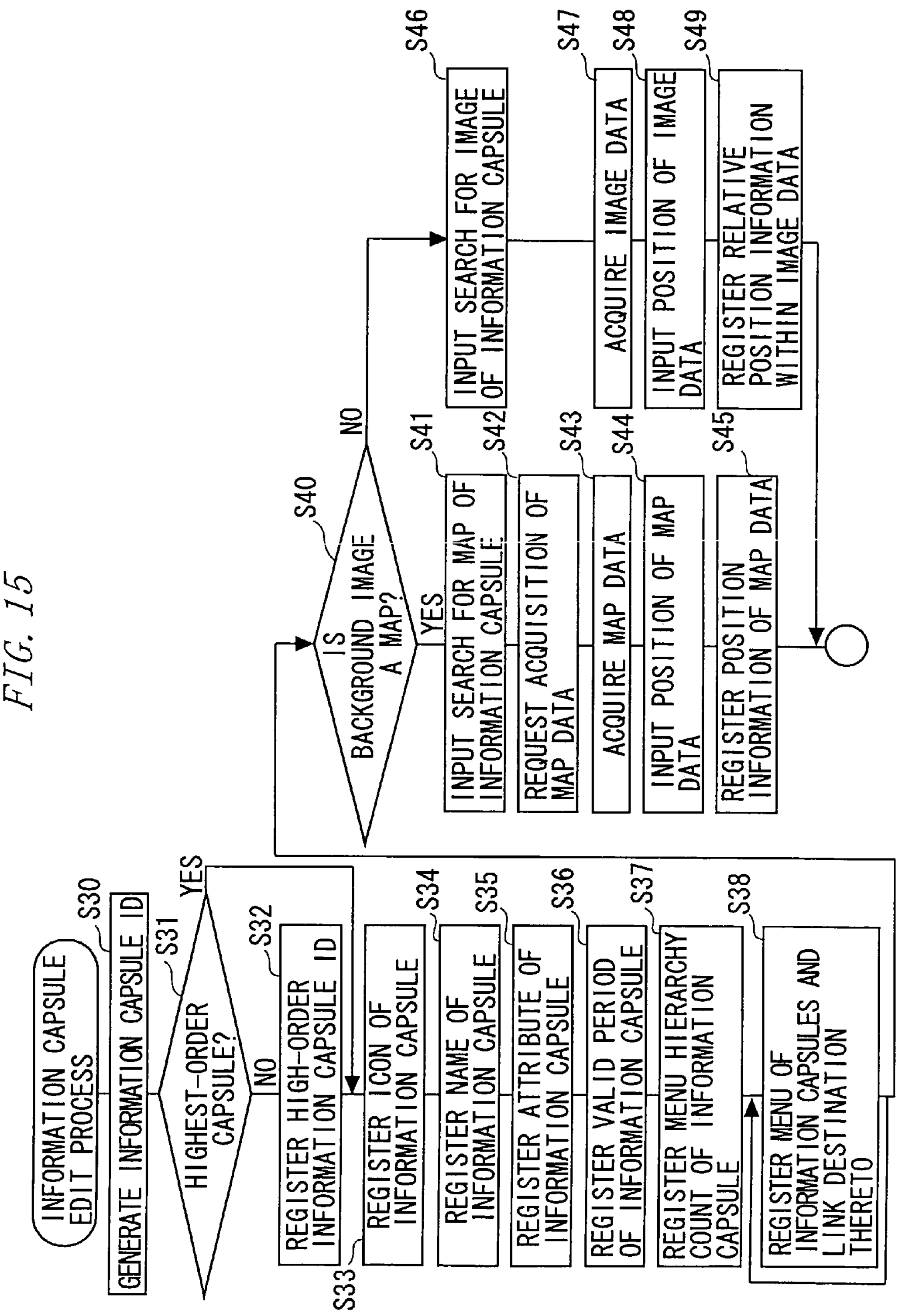
FIG. 15 is a flowchart showing an edit process of the information capsule.

FIG. 15 shows an information capsule edit process. This process supports creation of the information capsule by an information provider, e.g., an article advertiser who desires to distribute information by way of the information capsule, and by a surrogate creator who creates an advertisement. This process is actualized as a program of the application server or a program executed locally on the terminal 2. This type of program will hereinafter be called an edit program (the edit program may also be referred to as an authoring tool).

In this process, to begin with, the edit program generates an information capsule ID (S30). Next, the edit program prompts the information provider to designate as to whether the relevant information capsule is a highest-order capsule or not. Then, the edit program judges a result of the designation (S31).

If the relevant information capsule is the highest-order capsule, the edit program advances to a process in S33. Whereas if the information capsule is not the highest-order capsule, the edit program registers a higher-order information capsule ID in the capsule link information (see FIG. 6) (S32).

Next, the edit program prompts the information provider to register an icon of the information capsule (S33). The edit program further prompts the information provider to register a name of the information capsule (S34). The edit program still further prompts the information provider to register an attribute of the information capsule (S35). The edit program yet further prompts the information provider to register a valid period of the information capsule (S36).

Moreover, The edit program prompts the information provider to register a menu hierarchy count of the information capsule (S37). Then, the edit program prompts the information provider to register information capsule menus and link destinations associated with these menus by a quantity corresponding to the menu hierarchy count (S38).

Next, the edit program judges whether the background image is the map or not (S40). The background image is the map, which implies a case where the relevant information capsule is the highest-order information capsule (refer to the judgment in S31). When the background image is the map, the edit program waits for the information provider to input a search condition of the map data (S41).

When the information provider inputs the search condition of the map data, the server 1 requests the map information server 2 to acquire the map data (S42). Then, the server 1 acquires the map data (S43). Successively, the edit program displays the map data on the screen.

Next, the edit program prompts the information provider to input a map data position (S44). The map data position connotes a position in which the information capsule is disposed on the map. When the information provider inputs the map data position, the edit program registers the map data position in the position information database 15 (S45).

While on the other hand, when judging in S40 that the background image is not the map, the edit program waits for the information provider to input a search condition of the image (S46). Then, the edit program acquires the image from the image database 20 (S47). Further, the edit program displays the image on the screen.

Next, the edit program prompts the information provider to input an image data position (S48). The image data position connotes a position in which the information capsule is disposed on the background image. When the information provider inputs the image data position, the server 1 registers the image data position in the position information database 15 (S49). Thereafter, the edit program terminates the process.

Effect of Embodiment

As discussed above, according to the present information, the advertiser can define the object which the advertiser wants to advertise personally, for instance, a shop, an article, etc. as the information capsule, and can simply distribute the information. In this case, the image No. of the image to be image-linked and of the intra-image position is designated, whereby this information capsule can be incorporated into the menu link information of the higher-order information capsule via the image link.

For example, as for a shop located in an area 5 on the seventh floor of the edifice-B of the station building, if the image No. of the seventh floor of the edifice-B of the station building and a display position of the icon within the image are designated in the position information database 15, the shop capsule can be interlinked to a link such as Station Building Capsule=>Edifice-B 7th Floor Capsule=>Area 5.

Modified Example

According to the first embodiment discussed above, the district map is specified from the geographical information such as the address, the postal code, the station, etc., and the information capsule contained in the map is downloaded. The embodiment of the present invention is not, however, limited to such a procedure. A keyword search by using terms contained in the information capsule such as a name and an attribute of the information capsule may be usable (see FIG. 6). To be specific, the information capsule containing specified terms as the name and the attribute of the information capsule, may also be downloaded into the terminal 2.

Second Embodiment

Figure 16:
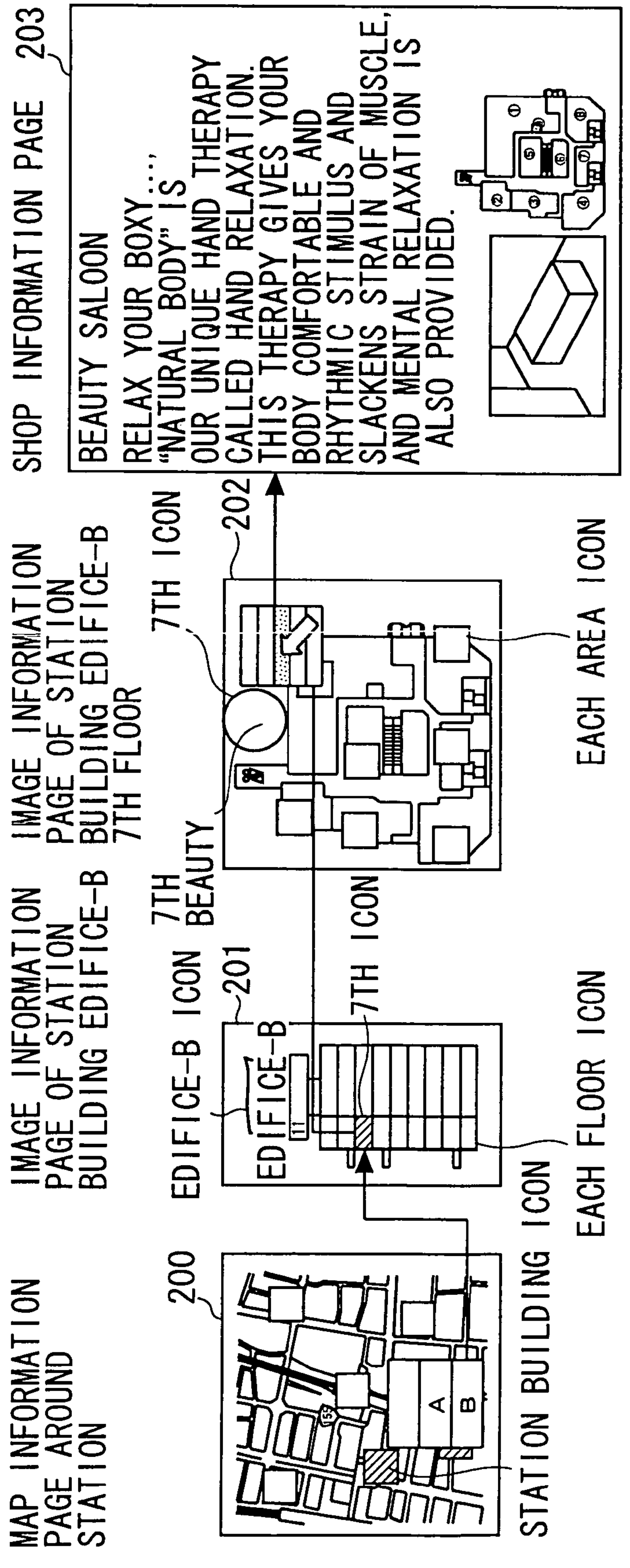
FIG. 16 is a diagram of links between the information capsules according to a second embodiment of the present invention.
Figure 17:
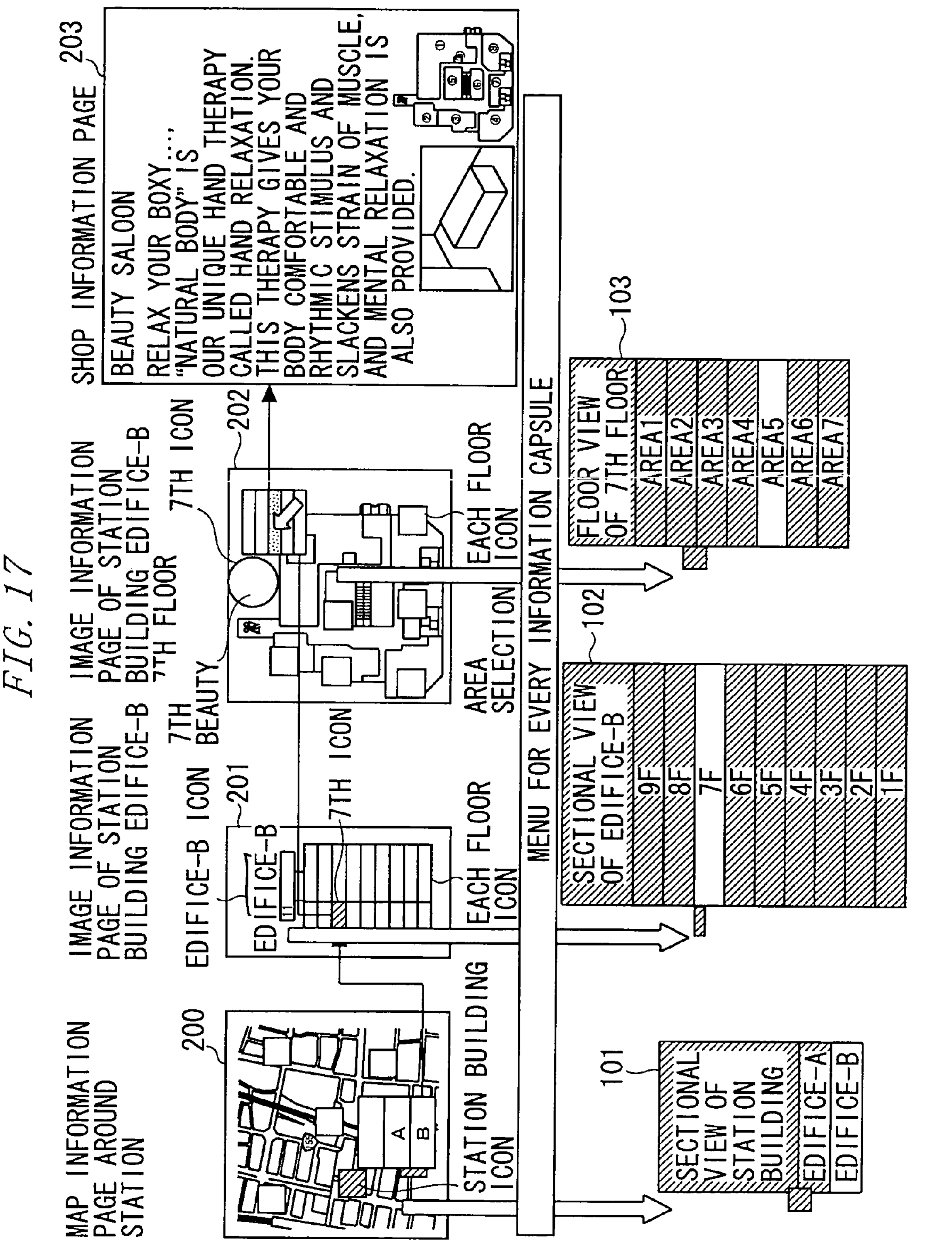
FIG. 17 is a diagram showing a relationship between the information capsule and a menu.
Figure 18:
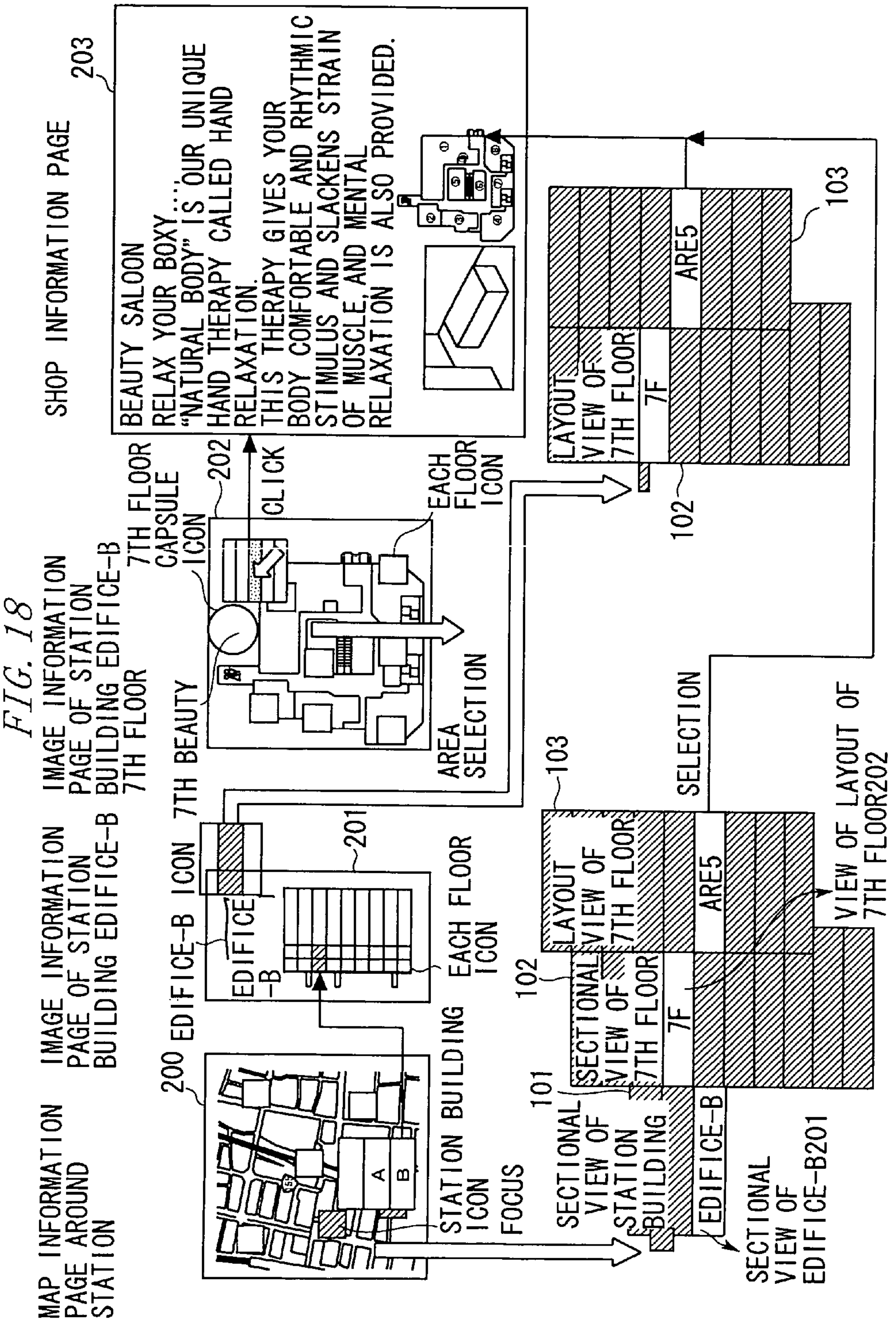
FIG. 18 is a conceptual view of a process of displaying menu items of the information capsule linked to a plurality of hierarchies throughout.
Figure 19:
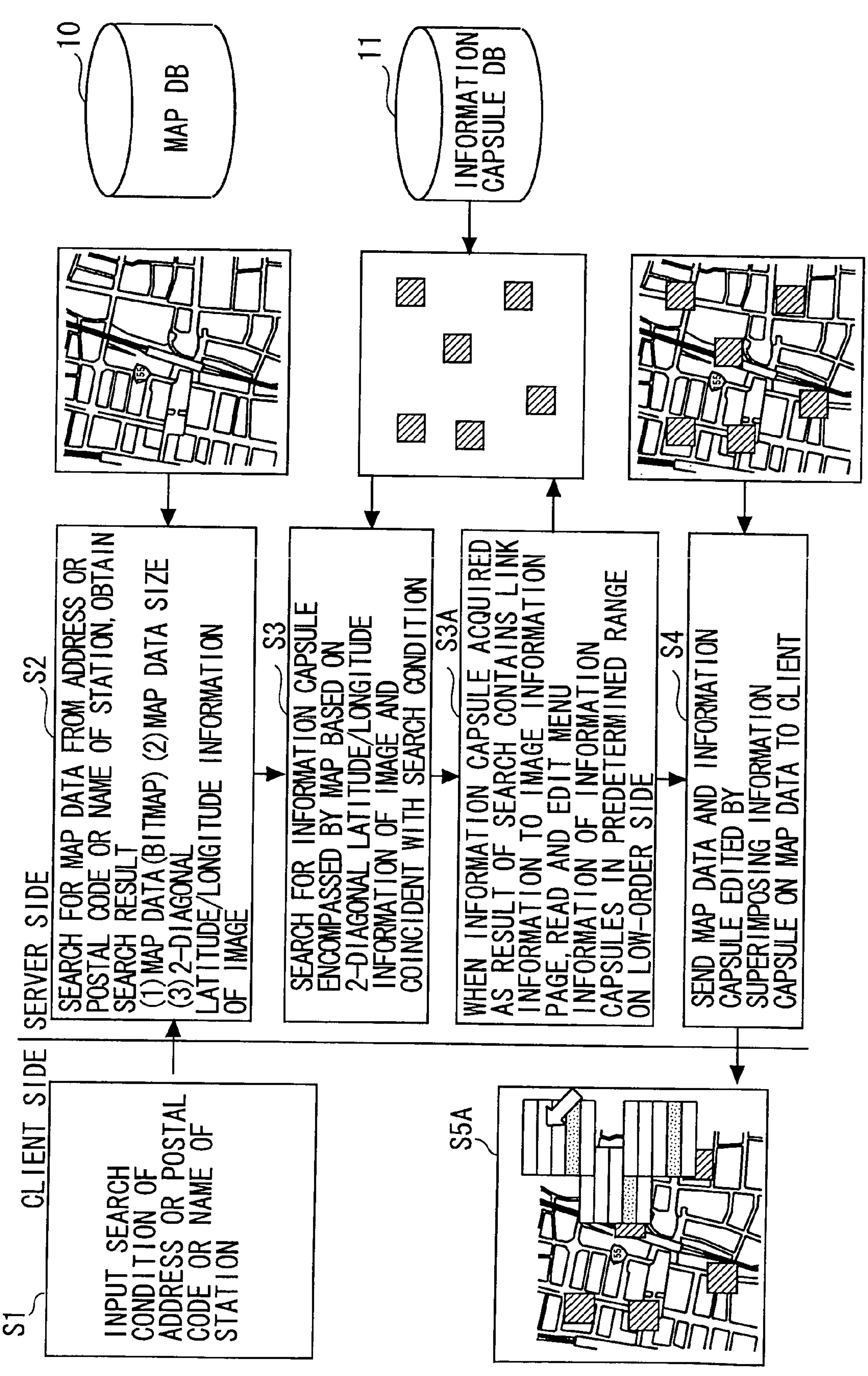
FIG. 19 is a flowchart (1) of displaying the menu items of the information capsule linked to the plurality of hierarchies throughout.
Figure 20:
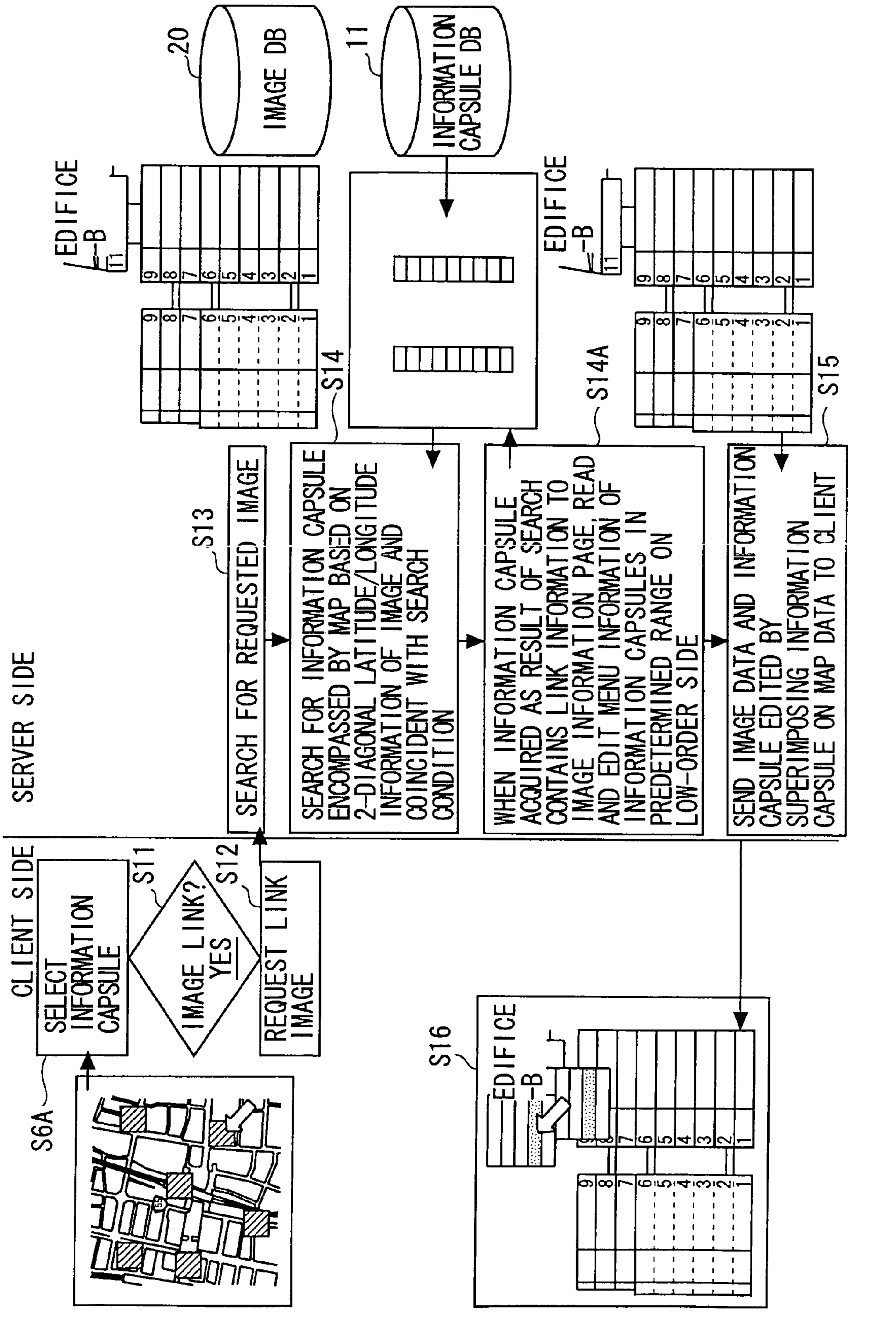
FIG. 20 is a flowchart (2) of displaying the menu items of the information capsule linked to the plurality of hierarchies throughout.
Figure 21:
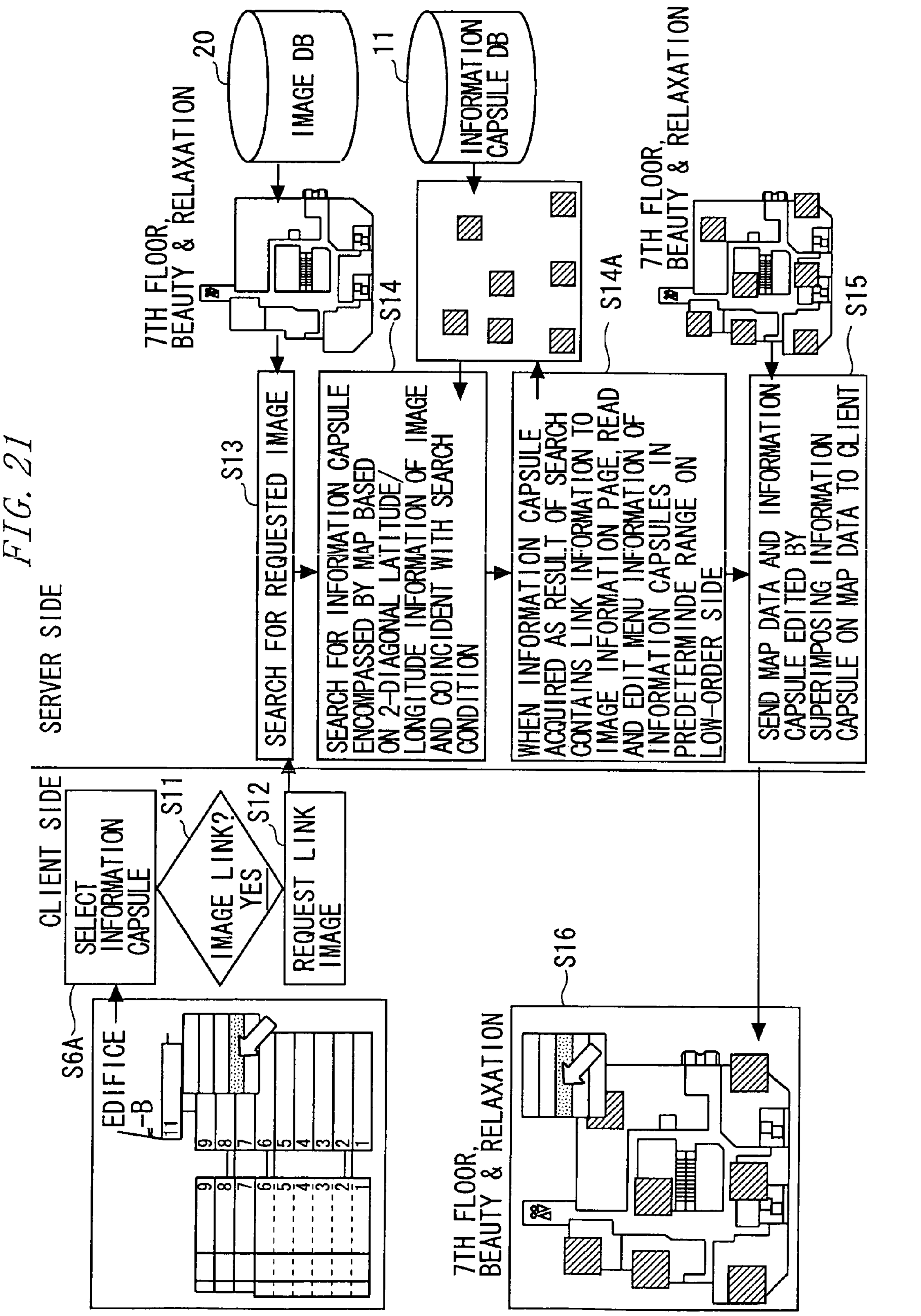
FIG. 21 is a flowchart (3) of displaying the menu items of the information capsule linked to the plurality of hierarchies throughout.

A second embodiment of the present invention will hereinafter be discussed with reference to FIGS. 16 through 21. FIG. 16 is a view of how the information capsules are interlinked according to the second embodiment. FIG. 17 is a view showing a relationship between the information capsule and the menu. FIG. 18 is a conceptual view of a process of displaying menu items of the information capsule linked to a plurality of hierarchies. FIGS. 19 through 21 are diagrams of processing flows for displaying the menu items of the information capsule linked to the plurality of hierarchies.

The first embodiment has exemplified the process of downloading the information capsule registered on the server 1 into the terminal 2 of the information user.

The second embodiment will exemplify a process executed by the information system when the information user downloads the information capsules configuring the plurality of hierarchies. In this case, the present information system downloads batchwise the menu/link information from the information capsules linked to the lower-order under the relevant information capsule, and gets the menus of the information capsules linking to the plurality of hierarchies displayed together on the terminal 2. Other configurations and operations of the present information system are the same as those in the first embodiment. Such being the case, the same components are marked with the same reference numerals of which the explanations are omitted. Further, the drawings in FIGS. 1 through 15 will be referred to when the necessity may arise.

Concept of Information System in Second Embodiment

FIG. 16 shows the view of how the information capsules are interlinked according to the second embodiment. As shown in FIG. 16, representations of the information capsules are given as image views on screens 200 through 203. The first embodiment has exemplified the procedure of reaching the target information (the information capsule or the Web page) by sequentially tracing the image link. In this procedure, the present information system downloads, e.g., a map on the screen 200, downloads the sectional view of the edifice-B of the station building, further selects the information capsule of the seventh floor of the edifice-B, then downloads the floor view of the seventh floor of the edifice-B on the screen 202, and finally downloads the information capsule of the target shop.

According to the second embodiment, the information system that downloads shop information directly from an around-the-station map information page, will be explained. The conventional Browser adopted, as such a method, a procedure of registering, for instance, a Web page of the shop in a bookmark and selecting the information capsule from a list of the bookmark.

The bookmark, however, necessitates the information user's accessing previously the Web page of the shop once at the beginning. Further, a problem inherent in the bookmark is its incapability of maintaining an information linkage such as Around-the-Station Map=>Station Building Edifice-B=>7th Floor=>Shop, and so on.

In the present information system, when the information user downloads the around-the-station map page, a plurality of information capsules linked to this map are traced, and further menus and links are traced extending over a plurality of hierarchies from information capsules that are image-linked to the former group of information capsules. Through such a process, the present information system provides the information user with a function of moving directly to the target information capsule or Web page.

FIG. 17 shows a relationship between the information capsule and the menu. As explained in the first embodiment, each information capsule has the menu/link information. For example, the information capsule (indicated by a station building icon) of the station building displayed on the screen 200 has a menu 101 containing a 'sectional view of the station building', the edifice-A and the edifice-B. Further, the information capsule (indicated by an edifice-B icon) of the station building edifice-B displayed on the screen 201 has a menu 102 containing a 'sectional view of the edifice-B' and the first through ninth floors (1F-9F). Moreover, the information capsule (indicated by a 7th floor icon) categorized as a station building edifice-B displayed on the screen 202 has a menu 103 containing a '7th floor view' and areas 1 through 8. Then, the area 5 is, for instance, linked to a floor view of the area 5 and to an information capsule of a shop categorized as a beauty saloon (which are shown as a screen 203).

FIG. 18 shows a concept of a process of displaying the menu items of the information capsule linked to the plurality of hierarchies. For example, when the information user focuses, e.g., the information capsule of the station building on the screen 200, the menu 101 (containing the selection items such as 'station building sectional view', the edifice-A and the edifice-B) of the station building capsule is displayed.

Then, when the information user focuses, e.g., the edifice-B as the selection item, the menu 102 (containing the selection items of 1F through 9F) of the station building edifice-B capsule, is displayed without downloading the image of the station building edifice-B.

Moreover, when the information user focuses the selection item of the seventh floor of the edifice-B, the menu 103 (containing the selection items of the areas 1 through 8) of the station building edifice-B 7th floor capsule is displayed without downloading an image of the station building edifice-B seventh floor.

On the other hand, when the information user selects, e.g., 'sectional view of the station building' from the menu 101, the Browser on the terminal 2 sends an image No. of the sectional view of the station building to the server 1, and the server 1 is requested to download the image link based on the image of the sectional view of the station building.

The server 1 accepts the request and searches through the image database 20 on the basis of the received image No., thereby obtaining the designated image. Further, the server 1 refers to the information capsule contained in a range of this image. Then, the server 1 refers to the information capsule contained in the range of the image that has been referred to. Then, the server 1 disposes the thus-referred information capsule within the image. These processes are the same as those in the first embodiment.

Moreover, also when the information user selects the item of the edifice-A or -B, etc. from the menu 101, the processes of the terminal 2 and of the server 1 are the same as above. Further, also when the information user selects one of the items of the menus 102 and 103, etc., the processes of the terminal 2 and of the server 1 are the same as above.

For example, when the information user selects the area 5 from the menu 103 (as by, e.g., clicking of a pointing device), the floor view and the shop information capsule, which are associated with the area 5, are downloaded.

Thus, the present information system provides the function of directly accessing the desired information capsule by tracing the menus of the individual information capsules without any repetition of downloading the image with respect to the information capsule linked to the plurality of hierarchies throughout.

In the discussion made so far, there has been explained the procedure of tracing the hierarchy of the highest-order information capsule against the background image that is the map page on the screen 200. Such a procedure may, however, be executed from within a capsule other than the highest-order information capsule.

For instance, the information user selects the sectional view of the station building from the map page on the screen 200. Then, the server 1 searches, in the same procedure as in the first embodiment, the background image (e.g., the sectional view of the station building) of the station building capsule, the information capsules (e.g., the station building edifice-A capsule and the station building edifice-B capsule) contained in this background image, and the menu/link information contained in the information capsules of the predetermined hierarchies belonging to the low-order under the aforementioned individual information capsules, and edits and thus downloads these pieces of information as the station building edifice-A capsule and the station building edifice-B capsule.

It may be defined how far those hierarchies are traced along for downloading, as a system parameter of the server 1 or a user parameter retained by the server 1 for every information user. For instance, a value of three hierarchies is defined as the system parameter, and, when each individual information user downloads the information capsule, the menus of the information capsules for the three hierarchies under the download target information capsule are added (linked) to the download target information capsule. Further, if a specified information user defines this parameter as the user parameter, the priority may be given to the user parameter.

Moreover, when the information user selects the seventh floor of the edifice-B of the station building, the present information system searches the background image of the seventh floor of the edifice-B of the station building, the information capsules (e.g., the areas 1 through 8) contained in this background image, and the menu/link information contained in the information capsules of the predetermined hierarchies belonging to the low-order under these individual information capsules, thereby editing and downloading these pieces of information as the information capsules of the areas 1 through 8.

<Operation>

FIGS. 19 through 21 are diagrams of processing flows for displaying the menu items of the information capsules linked to the plurality of hierarchies. FIG. 19 shows procedures of searching for a highest-order information capsule from pieces of address-specifying information such as addresses, postal codes, station names, etc., and downloading the highest-order information capsule. Among these procedures, the procedures in S1 through S3 are the same as those in S1 through S3 in FIG. 9.

The server 1 searches the map database 10 for map data on the basis of the transmitted information such as the address, the postal code or the station name, etc., and thus acquires a result of the search (S2).

Next, the server 1 searches the information capsule database 11 for an information capsule contained in the relevant map and coincident with a search condition on the basis of latitude/longitude information of two diagonal positions (S3). To be specific, the server 1 searches the position information database 8 for the information capsule of which the latitude and the longitude are encompassed by the range of the relevant map.

Subsequently, the server 1 judges whether or not the retrieved information capsule contains the link information (the image link) to image information pages. Then, when this information capsule has the image link, the server 1 refers to the information capsule within a range of a predetermined hierarchy from the information capsules linked (to one or more hierarchies) under this image link, thereby reading the menu/link information of this information capsule referred to. Then, the server 1 adds the readout menu/link information to the menu/link information of the information capsule searched for in S3, thus editing the information capsule (S3A). Through this process, the menu/link information is read from the information capsules linked to one or more hierarchies throughout in the low-order direction of the information capsule searched for by the process in S3 (which will hereinafter be called a target capsule), and is added to the target capsule.

Next, the server 1 performs editing in a way that superimposes the retrieved information capsule (target capsule) on the map data, and sends the edited data to the terminal 2 (client) (S4). The terminal 2 displays the received information capsule on the map (S5A). Unlike the first embodiment, however, as for the information capsule according to the second embodiment, the menu/link information of the low-order information capsules is taken in. Accordingly, when the information user focuses each information capsule on the map, a menu of low-order information capsules is displayed. Further, when focusing a menu item, a menu of lower-order information capsules is further displayed.

Thus, according to the information system in the second embodiment, the information user can display directly the desired information capsule by sequentially displaying the menus without downloading the image each time with respect to the information capsules linked to the plurality of hierarchies throughout.

FIGS. 20 and 21 are diagrams each showing a processing flow of the information capsule containing the image link. A result of the operation shown in FIG. 19 and a process for the information capsule displayed on the terminal, will hereinafter be described. Among these procedures, the procedures other than S6A and S14A are the same as those shown in FIG. 11 and are therefore marked with the same symbols, and their explanations are omitted.

After downloading the information capsule encompassed by a range of a map in FIG. 19 and coincident with a search condition of the information user, the information user selects, e.g., the information capsule of the station building (S6A).

Thereupon, the server 1 judges whether or not this information capsule contains the link information (image link) to the image information page. Then, when the information capsule contains the image link, the server 1 searches for the background image and the information capsule contained in this background image in the same procedures as those in the first embodiment (S13, S14).

According to the present information system, the server 1 further searches in the low-order direction the image link of the information capsule searched for in S14. Specifically, when the information capsule searched for in S14 contains the image link, the server 1 searches for the menu/link information contained in the information capsule in a predetermined range on the low-order side. Then, the server 1 adds this menu/link information to the information capsule searched for in S14, thus editing the information capsule (S14A). The processes from this process onward are the same as those from S3A onward in FIG. 19. Through these processes, the information capsules associated with the respective floors of the edifice-A and the edifice-B are superimposed on, e.g., the image of the sectional view of the station building, and the menu/link information of the low-order information capsules is added to each (target) information capsule, whereby the (target) information capsule is downloaded into the terminal 2.

When the information user focuses the information capsule associated with each floor on the image of the sectional view of the station building, as shown in FIG. 18, the menu of the low-order information capsules is sequentially displayed (S16). On the other hand, when the information user selects a specified menu item, an image link or a Web page associated with this menu item is downloaded.

FIG. 21 shows a process when selecting the menu of the edifice-B information capsule contained in the image of the sectional view of the station building. An object of this process is the same as in FIG. 20 except such a point that the background image changes to the image of the sectional view of the station building from the map.

Effect of Embodiment

As discussed above, the present information system (server 1) downloads the information capsule into the terminal 2 in a way that adds the menu/link information of the (low-order) information capsules linked to the plurality of hierarchies throughout to the high-order information capsule. Accordingly, the information user can select directly the menu of the low-order information capsules without any repetition of downloading the image linked to the plurality of hierarchies throughout.

Further, in this case, the scheme is not that URL of the once-accessed page is registered as by the conventional bookmark but that there can be maintained the information representing the hierarchical structure such as Map=>Building Sectional View=>Floor View=>Shop=>Article, etc., and the information user can therefore search for the information linked to the menu of the low-order information capsules in a state of keeping the logical relationship between the (high-order) information capsule and the (low-order) information capsules.

Third Embodiment

Figure 22:
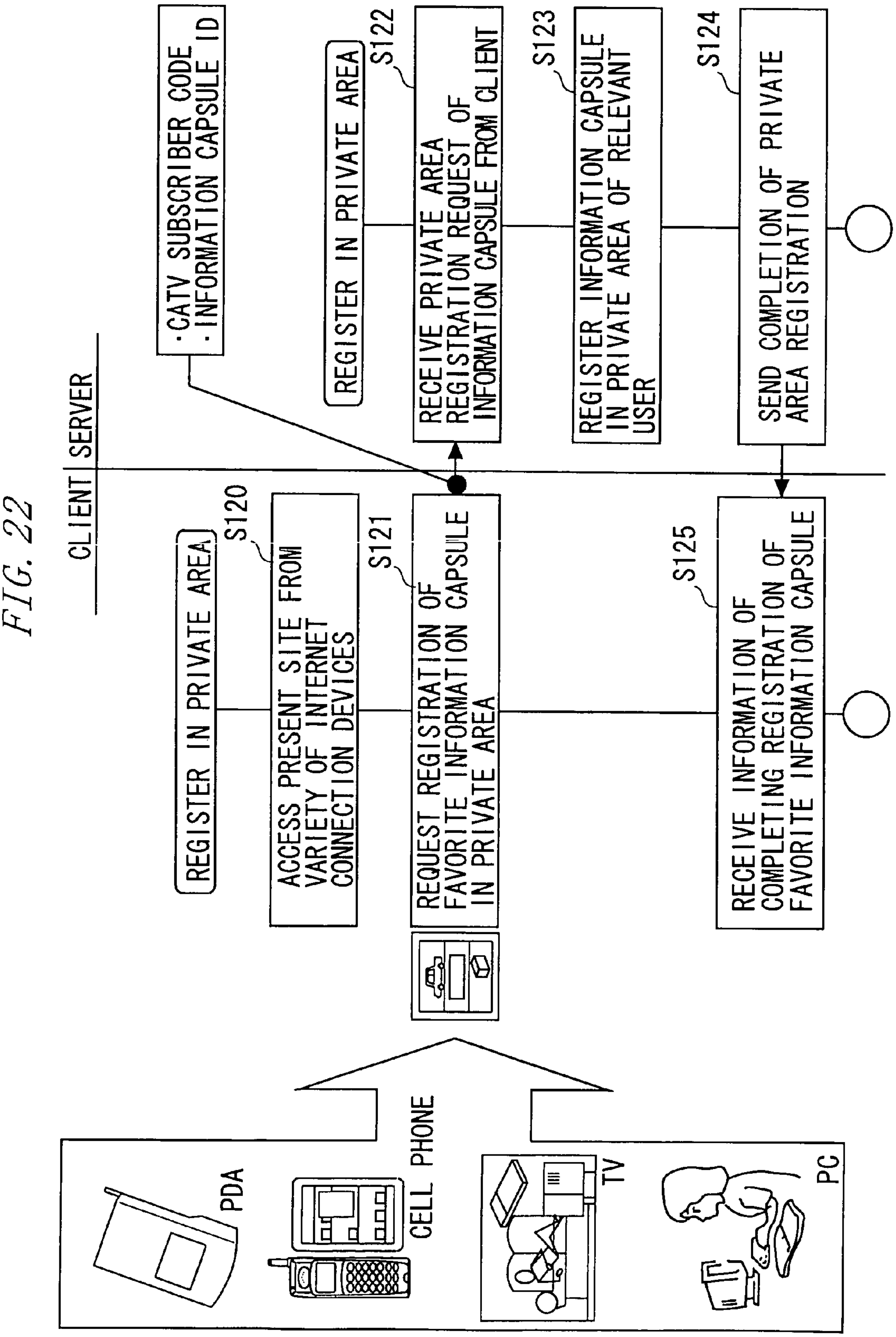
FIG. 22 is a flowchart showing a process of registering the information capsule in a private area in a third embodiment of the present invention.

A third embodiment of the present invention will be described with reference to FIGS. 22 and 23.

The first embodiment and the second embodiment have exemplified the information system in which the district specifying information (the address, the postal code, the station name) and the search condition are designated, and the relevant information capsule is displayed on the terminal 2 of the information user.

The third embodiment will exemplify an information system for providing a function of storing such an information capsule in a private area for every information user and improving usability for the information user. Other configurations and operations of the present information system are the same as those in the first embodiment or the second embodiment. Such being the case, the same components are marked with the same reference numerals, and their explanations are omitted. Further, as the necessity may arise, the drawings in FIGS. 1 through 21 will be referred to.

This private area is ensured for every information user in the private database 16 (see FIG. 1) on a hard disk of the server 1 and is managed by an information user ID (which is a subscriber code to the information system). The information user accesses the private area as a Website on the network.

This Website is referred to as a MySite. FIG. 22 is a diagram showing a process of registering the information capsule in the private area.

Normally, the information user accesses the MySite from on a variety of Internet connection devices (which will hereinafter simply be called clients) (S120). Herein, the variety of Internet connection devices are, for instance, a PDA, a cellular phone, a PHS, a television set having a communication line connecting function of a telephone, etc., a personal computer, a set-top box and so on.

Next, the information user gives a registration request to server 1 in order to get a favorite information capsule registered in the private area (S121). This is attained by selecting, e.g., a menu titled 'Register in MySite' in the pop-up menu of the information capsule.

Upon selecting this menu titled 'Register in MySite', a subscriber code to a provide (which is a subscriber code to, e.g., a Cable TV company) for the information user concerned and an information capsule ID of the relevant information capsule, are transmitted to the server 1.

The server 1 receives the registration request (containing the subscriber code and the information capsule ID) from the client (S122). Then, the server 1 registers the information capsule in the private area identified with the subscriber code of the information user concerned (S123). At this time, the information capsule ID of this information capsule is stored on the private database 16 (see FIG. 1).

Next, the server 1 transmits completion of having registered the information capsule in the private area (S124). With the transmission thereof, a message saying that the registration of the information capsule has been done is displayed on the client (S125).

Figure 23:
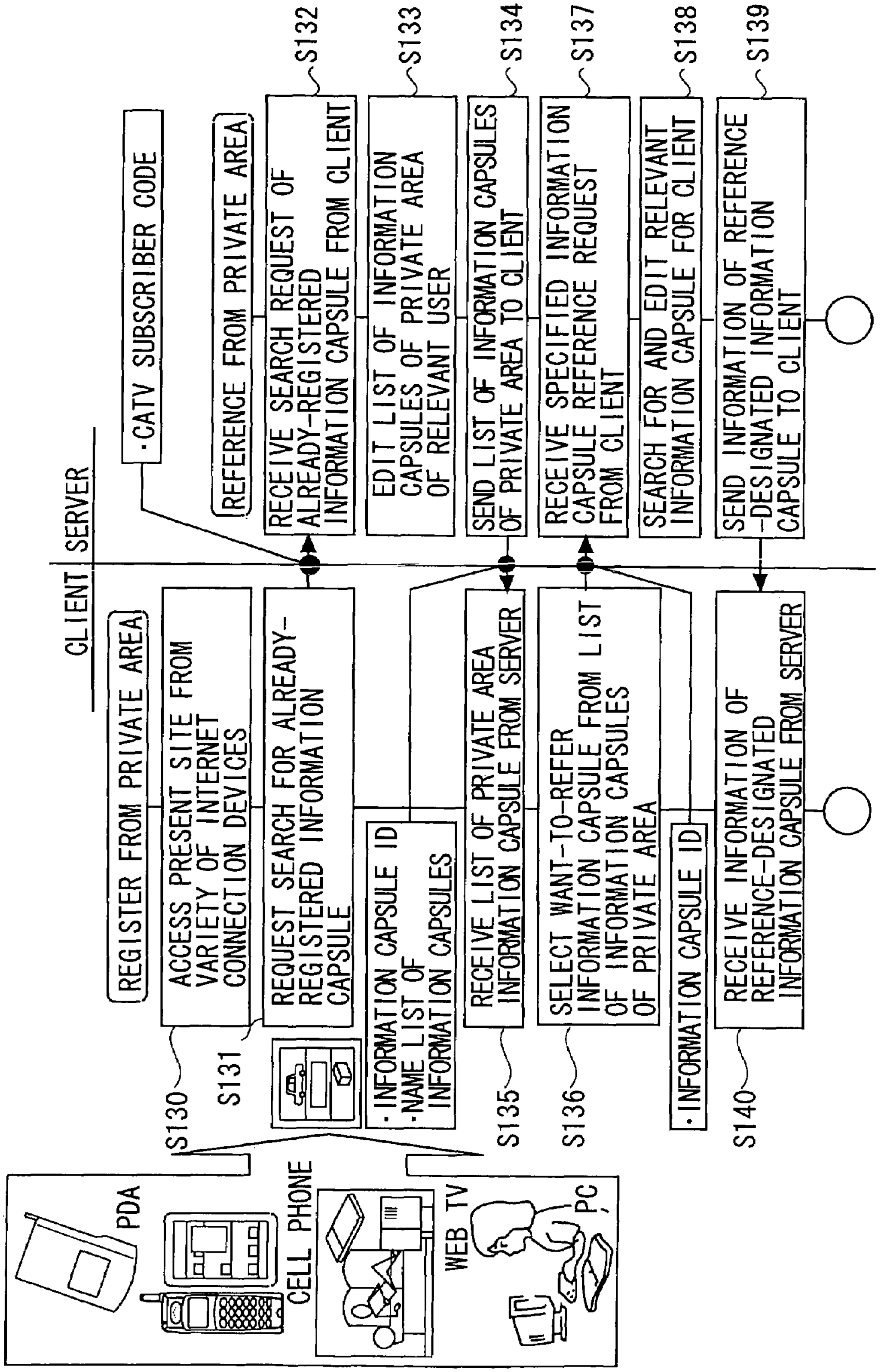
FIG. 23 is a flowchart showing a process of referring to the information capsule from the private area in the third embodiment of the present invention.

FIG. 23 shows a process of referring to the information capsule in the private area. In this process, the information user accesses the MySite from on the variety of Internet connection devices (clients) (S130).

At this time, the client requests the server 1 to search for the already-registered information capsule (S131). At this moment, the subscriber code of the information user is sent. This request is received by the server 1 (S132). The server 1 searches for, based on the subscriber code of the information user, the information capsule registered in the private area for the relevant information user, and edits an information capsule list (S133). Then, the server 1 transmits this information capsule list to the client (S134).

Upon this transmission, the client receives the information capsule list from the server 1 (S135). At this time, the information user selects the want-to-refer information capsule from the information capsule list (S136).

Then, the information capsule ID of this information capsule is sent to the server 1. The server receives a reference request to the information capsule together with the information capsule ID thereof (S137).

The server 1 performs client-oriented editing by searching for the information capsule concerned (S138). Then, the server 1 transmits the reference-request-accepted information capsule to the client (S139). Through this transmission, the client receives the information capsule selected in S136 from the server 1 (S140).

As discussed above, according to the information system in the third embodiment, the information user can register the desired information in the private area for every information user that is managed by the server 1. Accordingly, the information user previously registers the information capsule in the private area by operating, e.g., the cellular phone, and can refer to the information capsule from on other information devices afterward such as the personal computer, the PDA and so forth. Namely, the information user can share the information capsule via the private area among the information devices.

Fourth Embodiment

Figure 24:
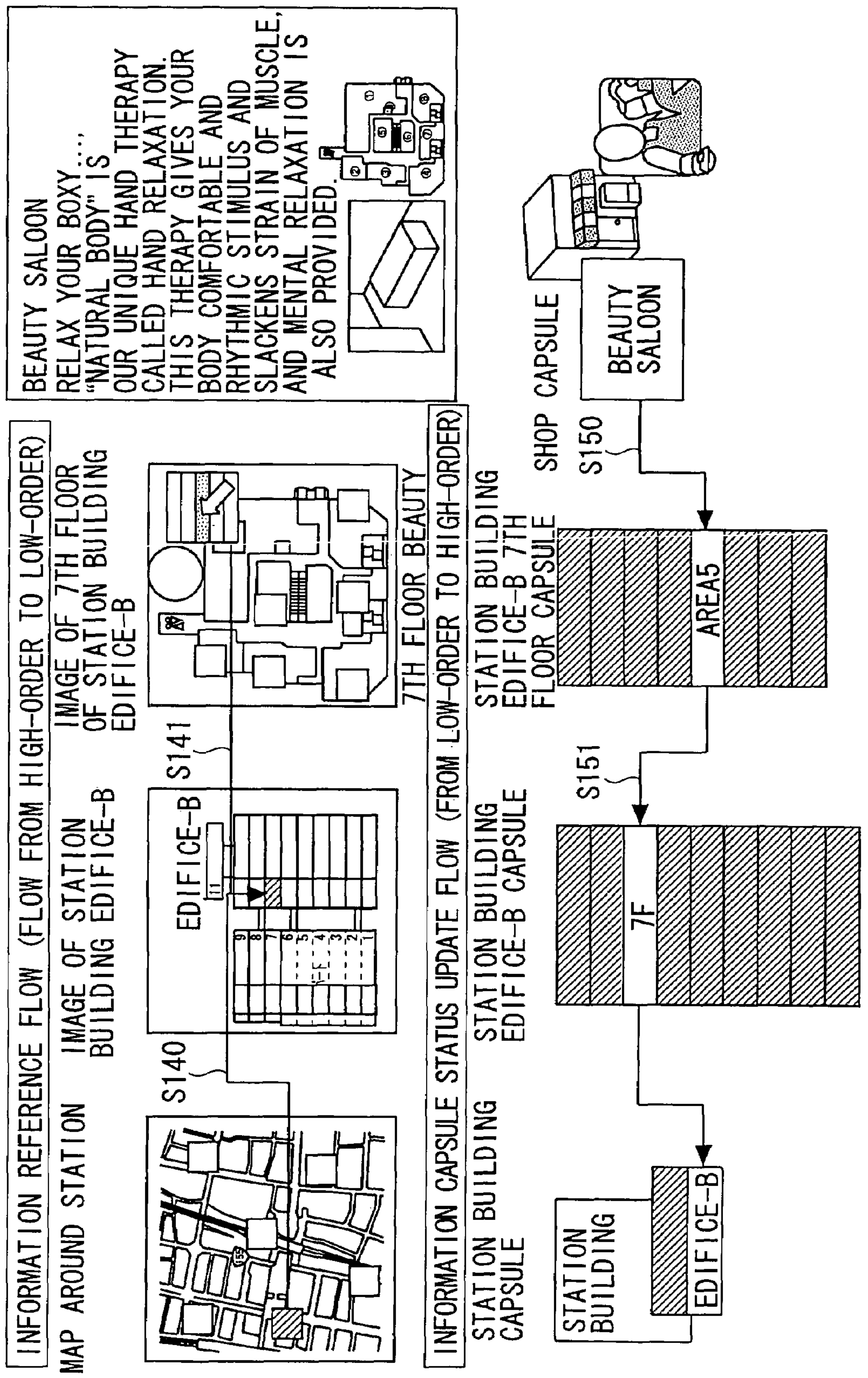
FIG. 24 is a conceptual view showing a process of updating the information capsule in a fourth embodiment of the present invention.
Figures 25, 26:
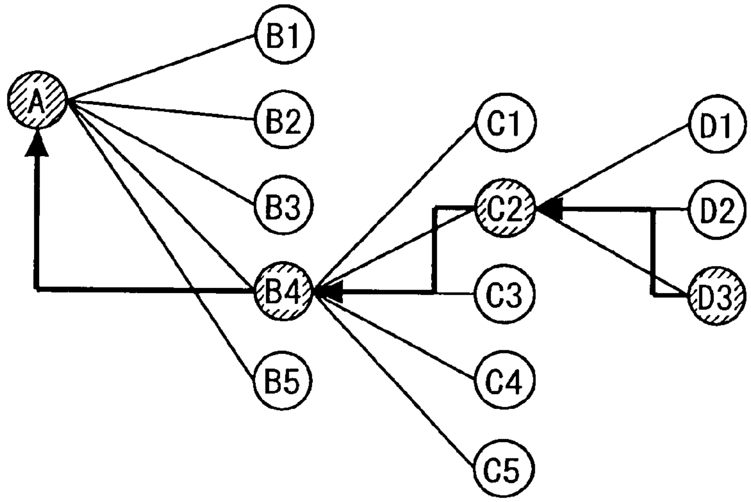
FIG. 25 is a diagram showing an update status of the information capsule.
FIG. 26 is a chart showing an example of a data structure of an information capsule management table in the fourth embodiment of the present invention.
Figure 27:
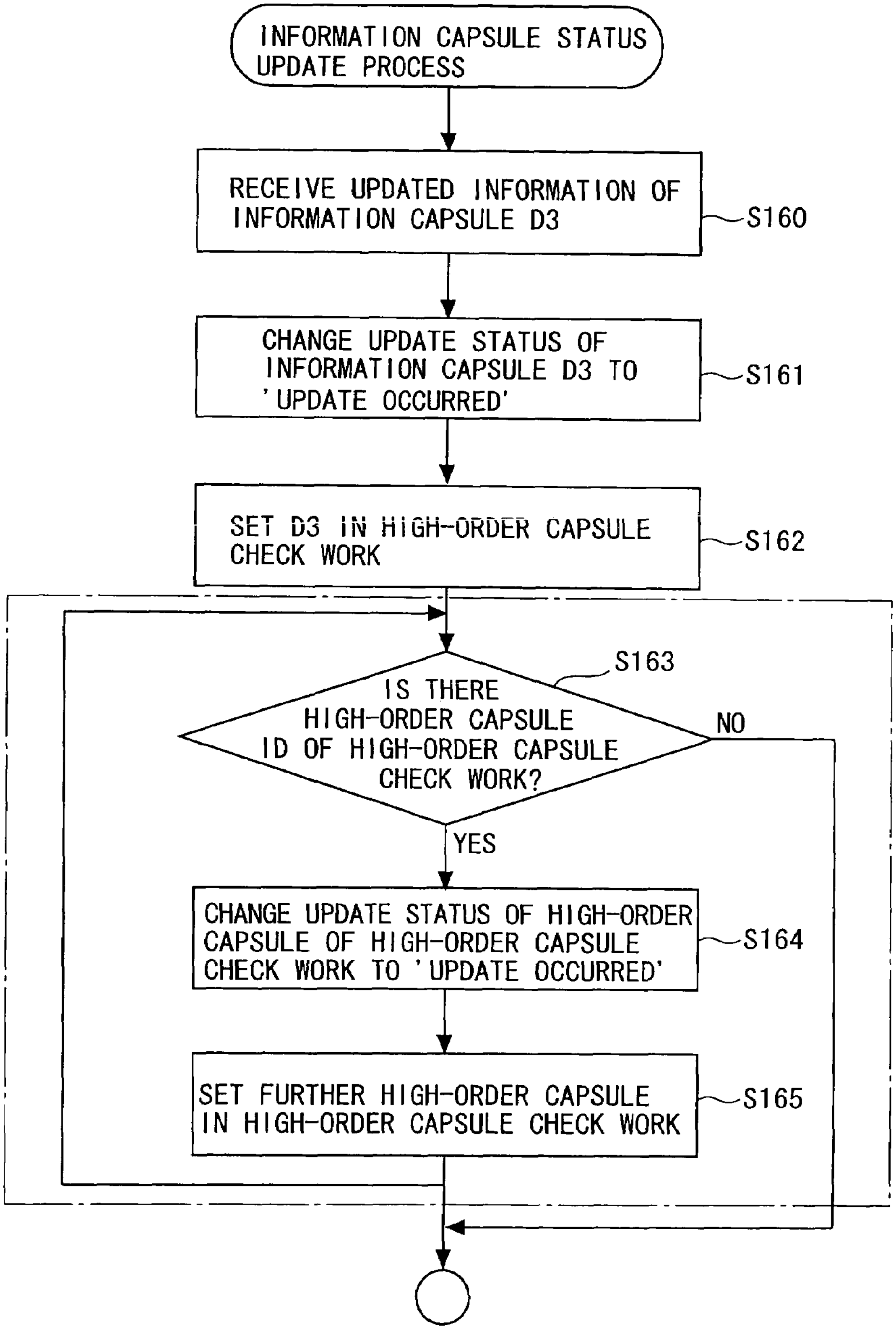
FIG. 27 is a flowchart showing the information capsule updating process.

A fourth embodiment of the present invention will be discussed with reference to the drawings in FIGS. 24 through 27. FIG. 24 is a conceptual view showing a process of updating the information capsule. FIG. 25 is a diagram showing an update status of the information capsule. FIG. 26 is a chart showing an example of a data structure of an information capsule management table. FIG. 27 is a flowchart showing the information capsule updating process.

The first embodiment and the second embodiment discussed above have exemplified the information system in which the district specifying information (the address, the postal code, the station name) and the search condition are designated, and the relevant information capsule is displayed on the terminal 2 of the information user.

The fourth embodiment will exemplify a function of, in addition to the above function, when the plurality of information capsules assuming the hierarchical relationship are updated, explicitly showing in a higher-order information capsule that those information capsules have been updated. Other configurations and operations of the present information system are the same as those in the first embodiment, the second embodiment or the third embodiment. Such being the case, the same components are marked with the same reference numerals, and their explanations are omitted. Further, as the necessity may arise, the drawings in FIGS. 1 through 24 will be referred to.

FIG. 24 shows a concept of the information capsule updating process. As explained in the first embodiment or the second embodiment, according to the present information system, the information user selects the menu via the icon of the information capsule (e.g., the station building) displayed on the map (S140), whereby a link image (an image of the station building) of the information capsule can be displayed. Further, when selecting the seventh floor of the edifice-B of the station building in the image of the station building (S141), a link image associated with the seventh floor can be displayed. Through this procedure, the information user can obtain an information capsule of, for example, an interesting shop (depicted as, e.g., a beauty saloon in FIG. 24).

On the other hand, the information capsule has, as shown in FIG. 6, a high-order-directional link through capsule link information. Accordingly, when the low-order information capsule is updated, the updating thereof can be easily transferred to the high-order information capsule.

For instance, when updating the information capsule of the shop categorized as the beauty saloon (which will hereinafter be called a beauty saloon capsule), the server 1 traces the capsule link information to a parent capsule of the beauty saloon capsule.

For example, when this beauty saloon capsule is linked to the information capsule of the seventh floor of the edifice-B of the station building (which will hereinafter be termed a station building edifice-B 7th floor capsule), the server 1 sets the beauty saloon area of the station building edifice-B 7th floor capsule in an update status on the basis of the updating of the beauty saloon capsule (S150). For instance, the server 1 effects black-and-white reverse display of a section of the area 5 to which the beauty saloon capsule in the image of the station building edifice-B 7th floor capsule belongs.

Moreover, the server 1, when the station building edifice-B 7th floor capsule comes to the update status, traces the capsule link information to the parent capsule of this station building edifice-B 7th floor capsule. Then, when the station building edifice-B 7th floor capsule is linked to an information capsule of the edifice-B (which will hereinafter be referred to as a station building edifice-B capsule), the server 1 sets the seventh floor area of the station building edifice-B capsule in the update status on the basis of the updating of the station building edifice-B 7th floor capsule (S151).

The server 1 sets the capsules in the update status that exist in the hierarchical structure ranging from the beauty saloon capsule up to the highest-order station building capsule by repeating these processes. As a result, the server 1, when the information user displays, e.g., a map peripheral to the station building, makes the information user recognize that any one of the information capsules under the station building capsule has been updated. The information user can obtain the latest information in a way that focuses the updated information capsule.

FIG. 25 exemplifies the update status of the information. As shown in FIG. 25, it is assumed that the highest-order information capsule against the background image of the map is expressed by "A" (which represents an information capsule ID, and the connotation is the same in the following discussion), information capsules linked to this information capsule A are B1 through B5, information capsules linked to the information capsule B4 are C1 through C5, and further information capsules linked to the information capsule C2 are D1 through D3.

Now, for example, a presumption is that the information capsule D3 be updated. In the information system according to the fourth embodiment, the information indicating the updating of D3 is transferred sequentially to the higher-order capsules C2, B4 and A. Then, when the information user accesses the information capsules A, B4, C2 or D3, it is explicitly shown that these information capsules or the information capsules belonging to the low-order thereof have been updated. The information user can therefore trace the hierarchical structure of the updated information capsules.

FIG. 26 shows an example of a data structure of an information capsule management table for managing the hierarchical structure of the information capsules. Each row of the information capsule management table retains a status of a single piece of information capsule. Each row of the information capsule management table has fields such as an information capsule ID, a high-order capsule ID and a capsule update status.

The information capsule ID field is stored with an information capsule ID of the information capsule under row-by-row management. Further, the high-order capsule ID is recorded with an ID of the information capsule linked to a higher-order by one hierarchy than each information capsule. Moreover, the capsule update status is recorded with data showing whether a content of the information capsule has been updated within a predetermined period (e.g., within two days).

According to the present invention system, when one information capsule is updated, all the information capsules ranked in the higher-order are set in the update status. For example, when the information capsule D3 is updated, there are recorded update occurrences of the higher-order capsule C2 than D3, the higher-order capsule B4 than C2 and the higher-order capsule A than B4. Under this management, the present information system explicitly shows the updated information capsules to the information user.

FIG. 27 is a flowchart showing the information capsule update process. In this process, the server 1 at first receives the update information of the updated information capsule, e.g., the information capsule D3 (S160).

Then, the server 1 changes the capsule update status of the information capsule D3 to 'update occurred' in the information capsule management table (S161).

Next, the server 1 sets the information capsule D3 in a capsule check work (S162). The capsule check work connotes a check target information capsule according to the present process.

Then, the server 1 judges whether or not the high-order capsule exists in the capsule check work (S163). When the high-order capsule exists in the capsule check work, the server 1 changes the update status of this high-order capsule to 'update occurred' (S164).

Subsequently, the server 1 sets this high-order capsule in the capsule check work (S165). Then, the server 1 returns the control to S163. Further, if it is judged in S163 that none of the high-order capsules exist in the capsule check work, the server 1 terminates the information capsule status update process.

As discussed above, according to the information system in the fourth embodiment, even when any one of the plurality of information capsules assuming the hierarchical relationship is updated, the update occurrences of the higher-order capsules than this updated information capsule can be explicitly shown, the information user can therefore, when tracing the hierarchy of the information capsules from the high-order down to the low-order, obtain the latest information by tracing the updated information capsule.

Fifth Embodiment

Figure 29:
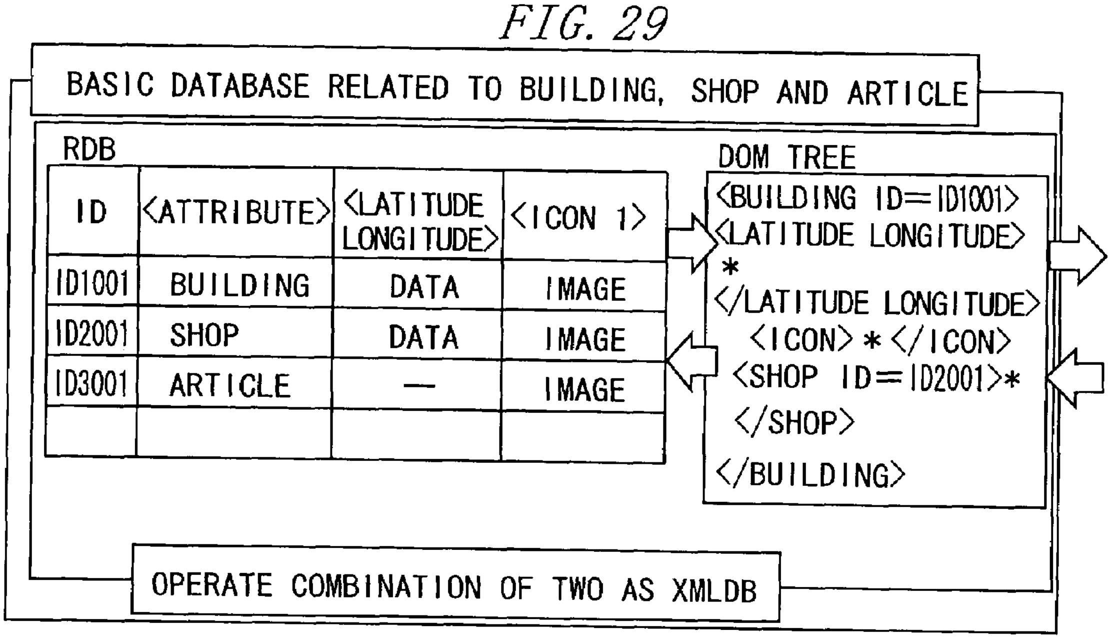
FIG. 29 is a diagram showing an outline of processing of the information system based on a mutual conversion between RDB and XML.
Figure 30:
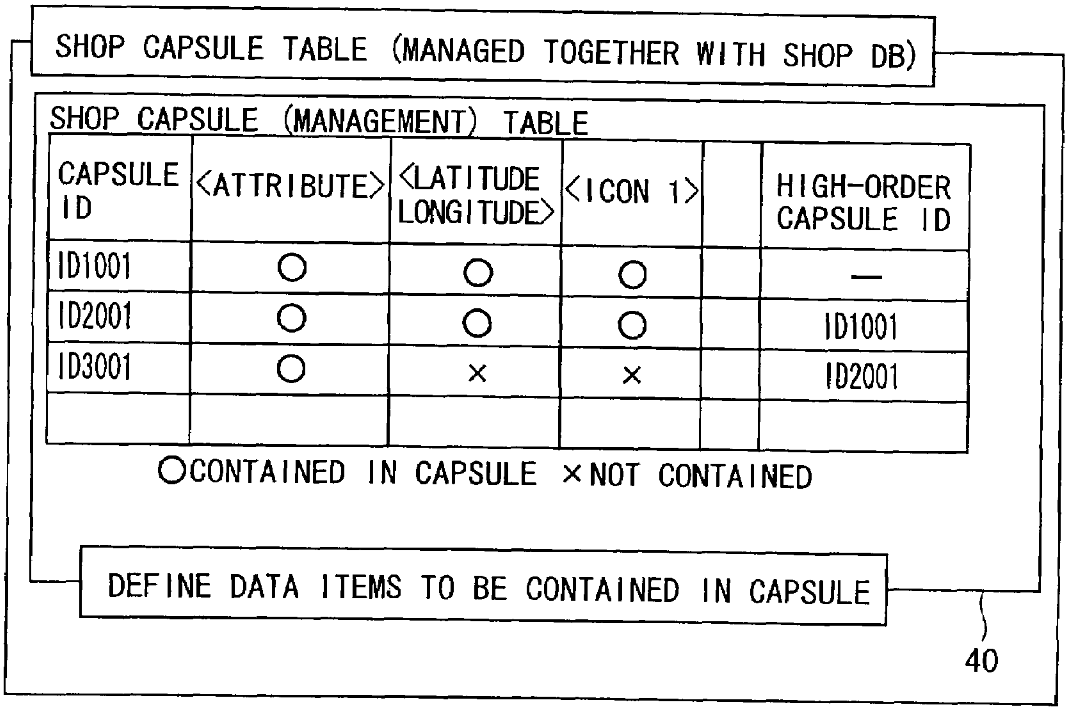
FIG. 30 shows an example of a capsule management table.
Figure 32:
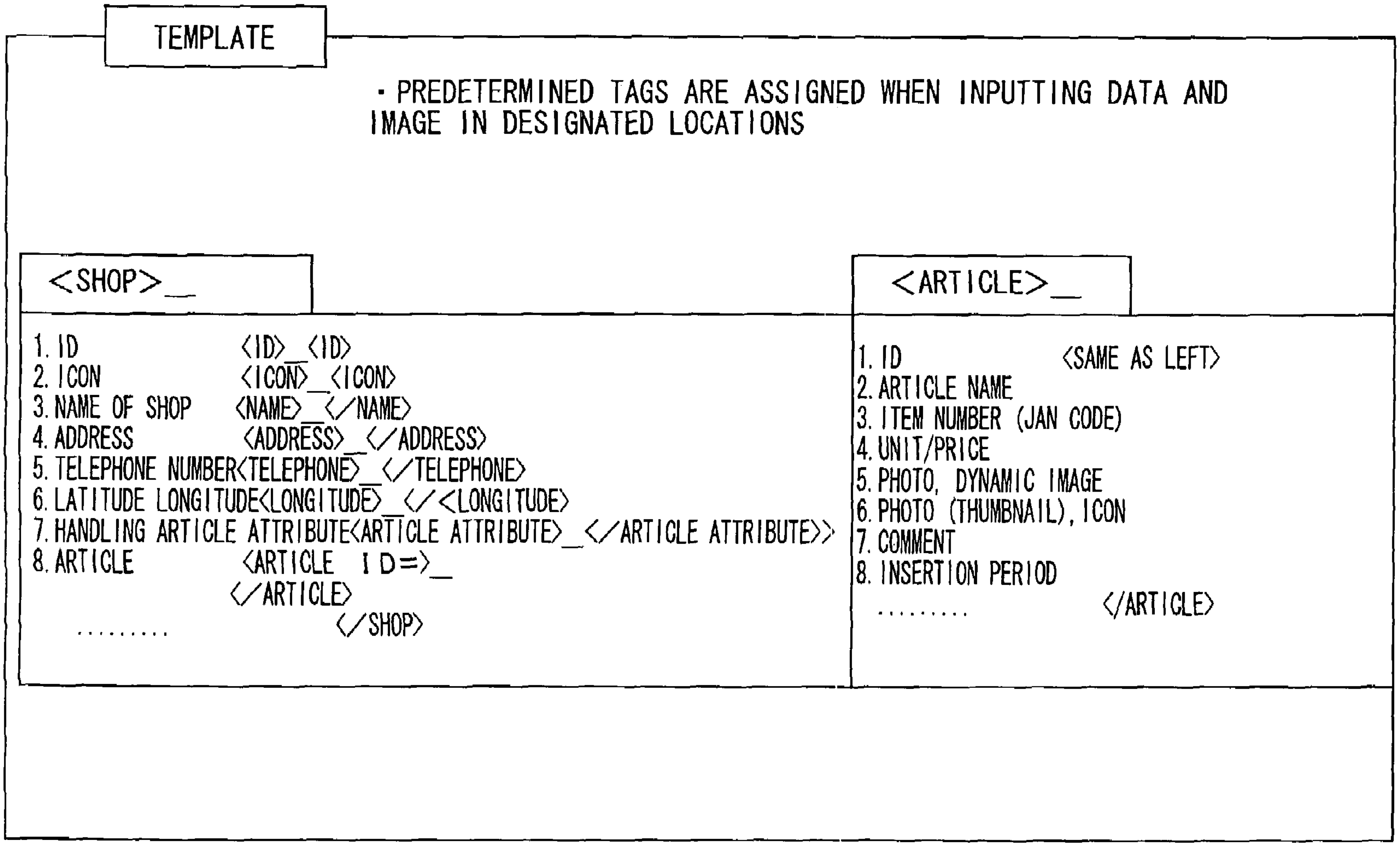
FIG. 32 shows an example of a template generated as a standard capsule.
Figure 33:
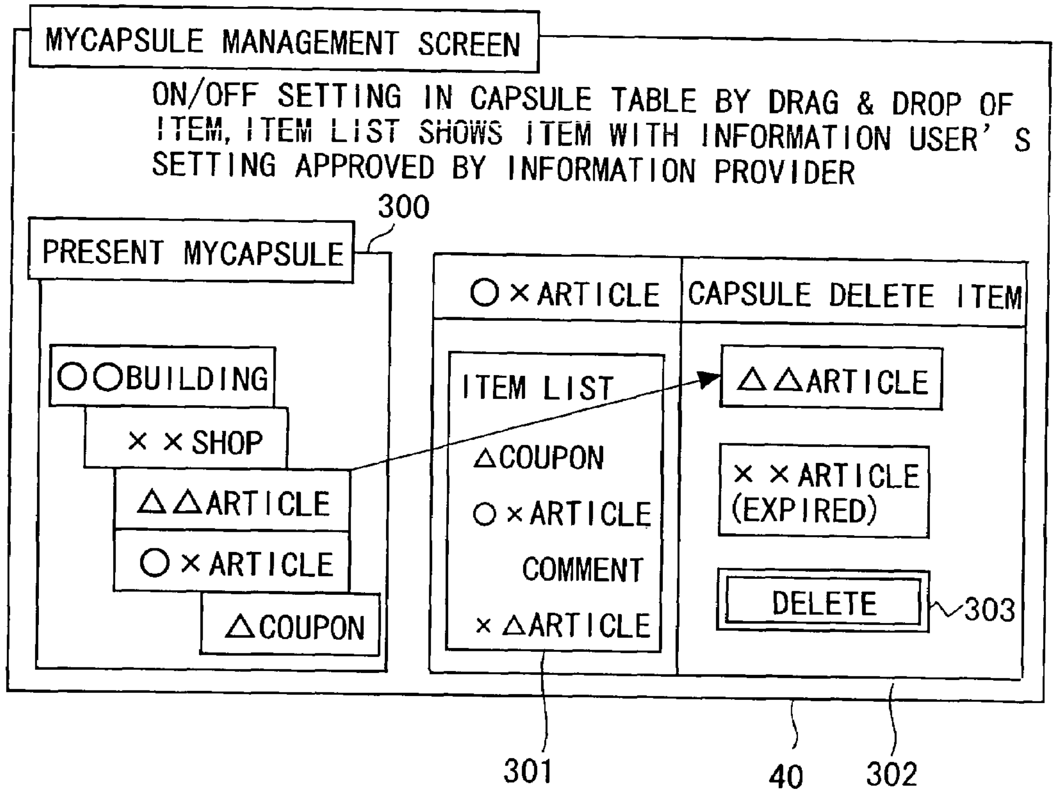
FIG. 33 shows an example of a MyCapsule management screen.
Figure 34:
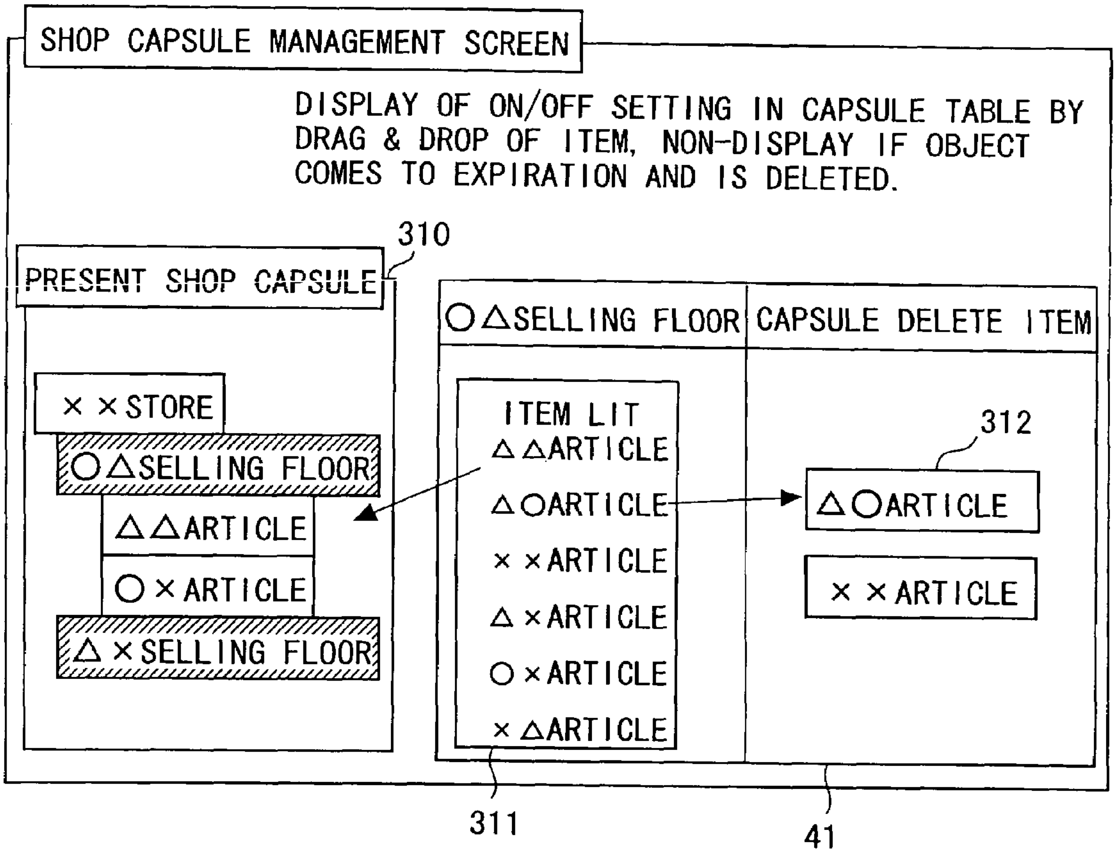
FIG. 34 shows an example of a shop capsule management screen.
Figure 36:
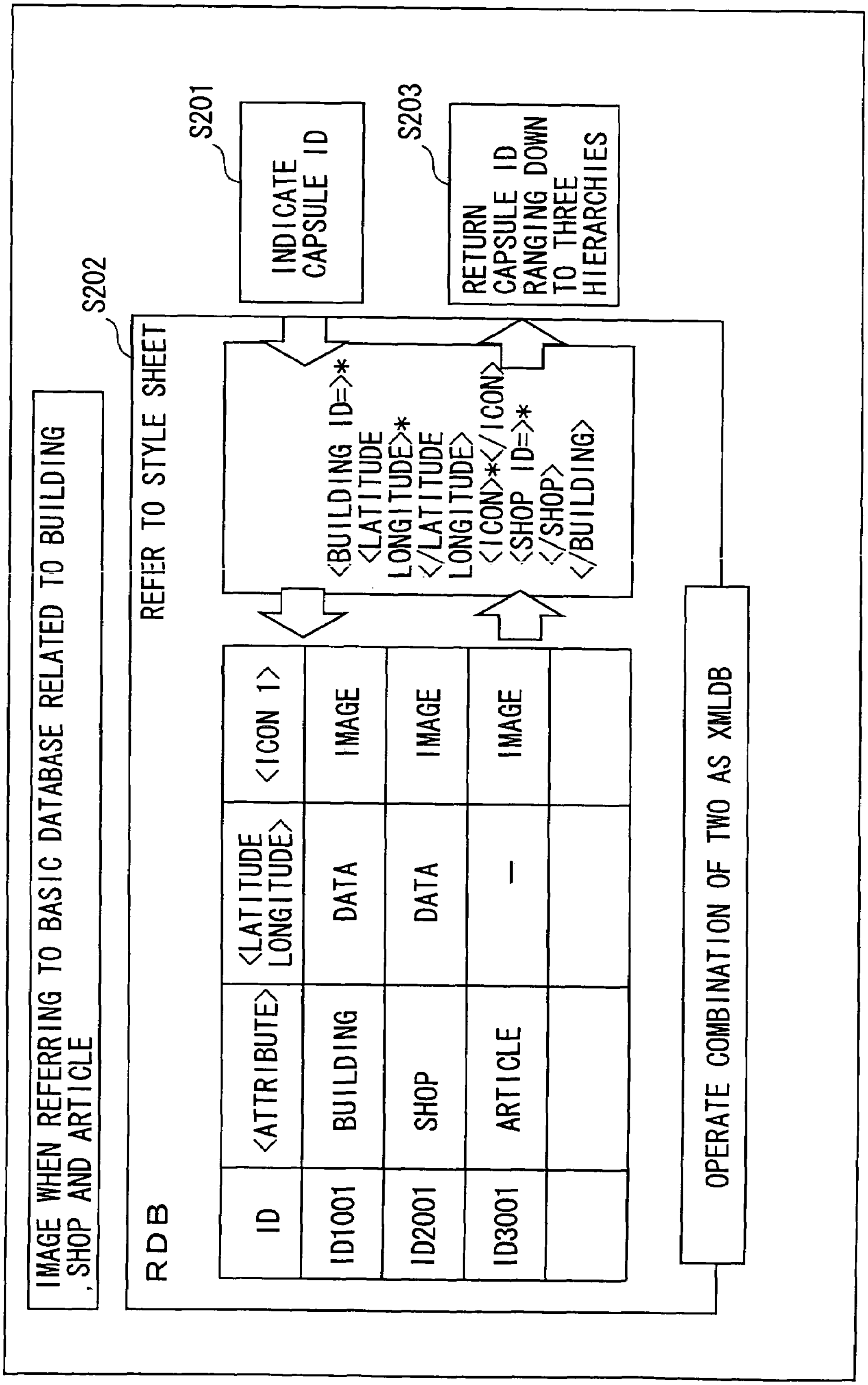
FIG. 36 is a diagram showing an outline of processing when referring to a database related to a building, a shop and an article.
Figure 38:
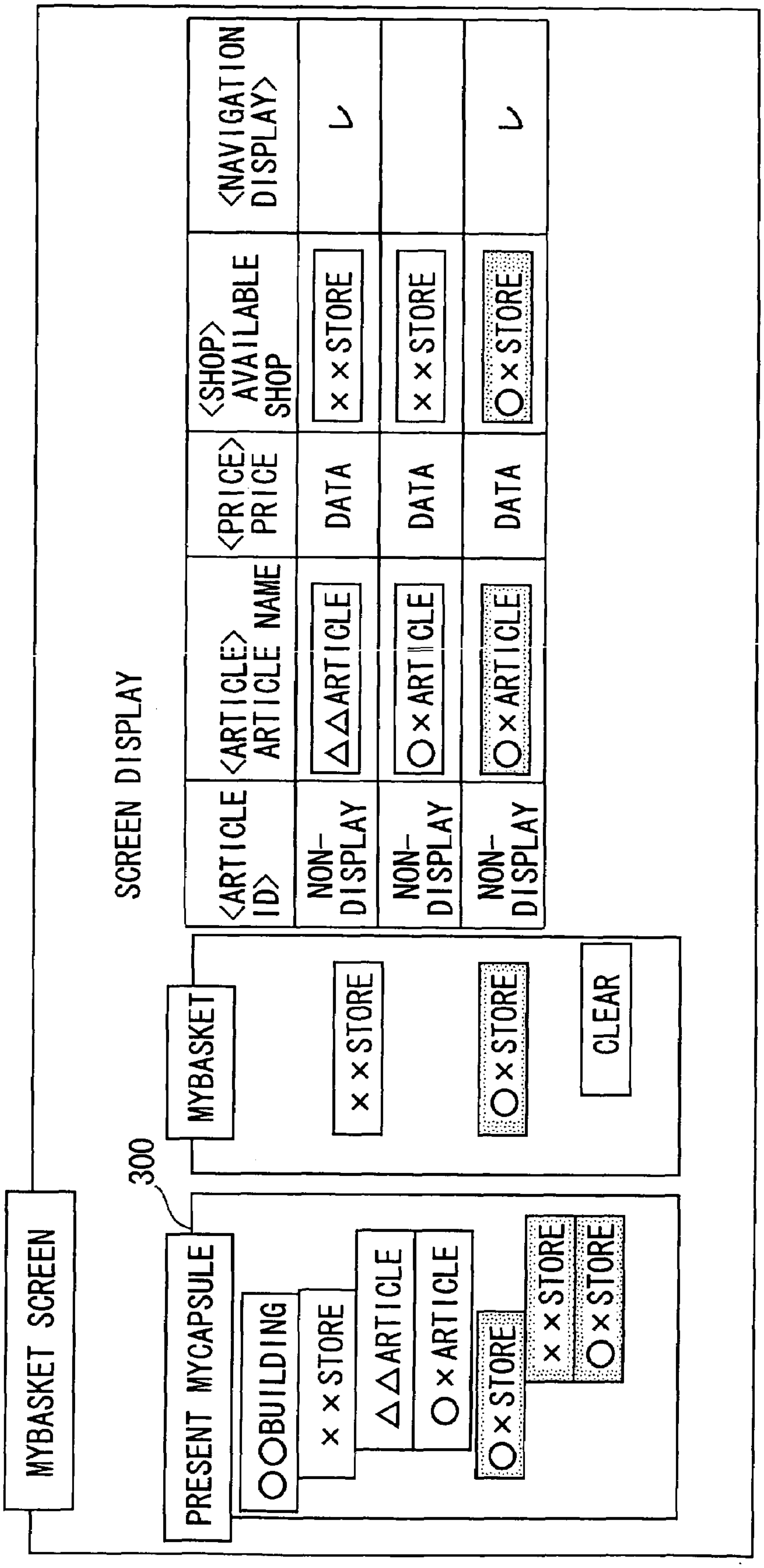
FIG. 38 shows a display example of a MyBasket-based information capsule.

A fifth embodiment of the present invention will be explained with reference to the drawings in FIGS. 28 through 38. FIG. 28 shows an example of data of the information capsule according to the fifth embodiment of the present invention. FIG. 29 is a diagram showing an outline of processing of the information system based on a mutual conversion between RDB (Relational DataBase) and XML (eXtensible Markup Language). FIG. 30 shows an example of a capsule management table. FIG. 31 shows an example of a MyCapsule management table. FIG. 32 shows an example of a template generated as a standard capsule. FIG. 33 shows an example of a MyCapsule management screen. FIG. 34 shows an example of a shop capsule management screen. FIG. 35 shows an example of a shop database batch management screen. FIG. 36 is a diagram showing an outline of processing when referring to the database related to the building, the shop and the article. FIG. 37 is a diagram showing an outline of processing when acquiring the capsules related to the building, the shop and the article. FIG. 38 shows a display example of a MyBasket-based information capsule.

The first embodiment through the fourth embodiments discussed above have exemplified the information system in which the plurality of information capsules are related to each other via the image link and are processed as the hierarchical information. Further, according to those embodiments, the discussions have been made on the assumption that the server 1 retains the data as a so-called table-formatted RDB (Relational Database).

According to the fifth embodiment, a process of extracting the data stored in the RDB and assembling the extracted data and the XML-scripted information capsule together, will be explained.

Other configurations and operations thereof are the same as those in the first embodiment through the fourth embodiment. Such being the case, the same components are marked with the same reference numerals, and their explanations are omitted. Further, as the necessity may arise, the drawings in FIGS. 1 through 27 will be referred to.

Description Example of XML-Based Database

FIG. 28 shows an example in which the hierarchical data of the plurality of information capsules are described in XML. In FIG. 28, a tag represents a definition of the information capsule in the way that the capsule ID is defined such as <capsule ID=ooo>.

For example, a definition of the building capsule is given in a tag set starting with <building capsule capsule ID =ooo> and ending with </building capsule>. In FIG. 28, however, all the information capsules linked via the menu/link information to the high-order information capsules are developed in-line and thus displayed.

For instance, the building capsule contains pieces information such as a longitude, a latitude, a large icon, an intermediate icon, a small icon, an icon banner (a definition of a banner type icon file name), an icon text, etc., and an event capsule, a link URL and a floor capsule.

Herein, the event capsule is an information capsule having none of the low-order information capsules. On the hand, the floor capsule contained in the building capsule has a much lower-order information structure. Namely, the floor capsule builds up a hierarchical structure such as Floor capsule=>Shop capsule=>Article capsule.

Thus, the hierarchical structure of the information capsule is simply expressed by an XML tag nested structure.

<Mutual Conversion Between RDB and XML>

The data processed by the present information system are stored in the RDB, then converted into XML-formatted data and transferred to an application program (which is, e.g., a server program for downloading the information capsule into the information user). FIG. 29 shows the outline of processing of the information system on the basis of such a mutual translation between the RDB and XML.

For example DataSpider (a trademark of Appresso Ltd.) is known as an interface program for mutually converting the RDB data and the XML data. Further, DataSpider is combined with a package program Yggdrasill (a trademark of Media Fusion Co. Ltd.). This softwarewise combination leads to a proposal agreed upon between these two companies, wherein the data stored in the RDB are processed based on XML.

Also in the information system according to the fifth embodiment, the data assembled as an information capsule are extracted out of the various categories of data stored in the RDB and then assembled based on XML as the information capsule (corresponding to mobile information). According to the fifth embodiment, the data stored in the RDB are called main data (corresponding to general information).

At this time, in the present information system, elements (which are termed data items) structuring a record (corresponding to each row in the table) in the RDB are associated with XML tags with information called a DOM (Document Object Model) tree. In this case, among the data items of the records in the RDB, the elements assembled into the information capsule are designated (defined) in the DOM tree.

As shown in FIG. 29, each record in the RDB is uniquely identified with a data item "ID". When each record is extracted as the information capsule, every information capsule retains this "ID" as an information capsule ID, which represents an association with the RDB record.

As discussed above, in the present information system, the hierarchical structure of the data items extracted from the RDB is described in the DOM tree. FIG. 29 shows a definition that, for example, the building capsule contains information elements such as a latitude/longitude, an icon 1, etc., and a low-order shop capsule.

Then, a content of the building capsule is stored as a record specified by ID1001. Further, the information elements such as the latitude/longitude, the icon 1, etc. are stored in the respective data items of the record specified by ID1001. Similarly, a data content of the shop capsule is stored as a record identified such as ID=2001.

Thus, the application program for processing the information capsule uses the DOM tree to access the RDB with the information capsule ID serving as a key, and inputs and outputs the data.

FIG. 30 shows an example of a capsule management table for managing the data items contained in the individual information capsule (the information capsule managed by the capsule management table in FIG. 30 is a shop capsule). The capsule management table is a table showing whether or not each information capsule contains the associated data items of the RDB. In FIG. 30, the capsule management table is displayed on a capsule management screen 40 as a tool for editing the information capsules.

The capsule management data in FIG. 30 are given as an example for the shop capsule. In FIG. 30, the data item contained in the shop capsule (the data item thus contained in the information capsule is called a capsule item) is marked with "o", while the data item that is not contained in the shop capsule is marked with "x". Accordingly, the capsule management table has the same items as the data items of the record in the RDB. It is sufficient that each of the items in the capsule management table retains 1-bit information such as "o" or "x".

It can be understood that the information capsule of which the information capsule ID is, e.g., ID1001 contains <attribute>, <latitude/longitude>, <icon 1> and so on.

In the capsule management table, even the data items of the capsule belonging to the high-order hierarchy above each information capsule are defined. This high-order capsule is defined by a data item "high-order capsule ID". Therefore, for instance, in the example of the capsule management table in FIG. 30, the definition is that ID2001 (a shop capsule) is ranked higher than ID3001 (an article capsule), and ID1001 (a building capsule) is ranked much higher than ID2001.

Note that the hierarchical structure of the information capsules is defined in the DOM tree, and hence the definition (the higher-order capsule ID) of the hierarchical structure of the capsule management table is not necessarily indispensable. Information capsule search performance can be enhanced by retaining the high-order capsule ID in the capsule management table.

When the information provider (for example, a proprietor of the shop or an advertiser) defines a structure of the main data (RDB) by use of an edit program (which may also be called an authoring tool), the edit program creates this type of capsule management table. This edit program has a capsule management screen 40 linked to the capsule management table, and the information provider can add or delete the capsule items as he or she intends.

FIG. 31 shows an example of a MyCapsule management table used for a MyCapsule owner (who is the information user having registered the information capsule in MySite) to manage MyCapsule (which is the information capsule registered in MySite described in the third embodiment). In FIG. 31 also, the capsule management table is displayed on the capsule management screen 40.

The MyCapsule management table is different from the normal capsule management table in terms of such a point that a management object is an individual information capsule registered in MySite. The function of defining the capsule items and the hierarchical relationship with the high-order capsule is, however, the same as the normal capsule management table has.

The information user who has registered the information capsule as MyCapsule in MySite is able to edit the user's own MyCapsule as he or she intends, and an edited result is stored in the capsule management table.

Namely, the capsule items of MyCapsule can be added or deleted based on a judgment of the capsule owner (who is the information user having registered MyCapsule in MySite). Further, for example, when the information user acquires an article information capsule as MyCapsule, the standard operation is that a high-order information capsule above this article information capsule, which is an information capsule of, e.g., an article sales shop or a building to which this shop belongs, etc., is acquired and registered in MySite.

FIG. 32 shows an example of a template used for the information provider to create the RDB main data. According to the fifth embodiment, the template is defined as 'framework-preset software' provided for the information user to facilitate the creation of the main data stored in the RDB.

The information provider can facilitate the creation of the main data by inputting characters, numerals in items indicated within this framework and by pasting (known as a processing procedure like copy & paste, drag & a drop, etc.) an image, a photo and so on.

Moreover, a sales promoting effect can be given by setting in this template an over-the-counter catch-the-customer's attention tool such as coupons, etc., a fixed-type catch phrase for appealing a merit of the article, a solicitation mark and an image by way of selection items.

Herein, the solicitation mark connotes an image mark representing merits of the article, the shop, etc. For example, the shop dealing with foods is assigned a mark implying 'freshness', a restaurant is assigned a mark invoking an image of 'high grade', 'low charge for the quality', etc.

A specified data item in the data items defined in this template is designed in linkage with an XML-scripted database. When inputting data in such a data item, an XML tag set is assigned thereto, and the tag-attached data is stored in a predetermined item on the RDB via the DOM tree. Among the templates, the template used for creating the shop information capsule is called a shop template.

When a proprietor (the information provider) of a certain shop inputs the main data of his or her own shop, the following procedures are executed.

(1) The information provider acquires an ID number and a password of the shop from a management company like CATV, etc. (or from a provider, etc.).

(2) Further, the information provider inputs an icon, a shop name, an address, a telephone number, etc. in predetermined input boxes on a shop template screen in accordance with instructions. Inputted data are stored as the main data on the RDB.

(3) Data items associated with the information capsule in the inputted data are assigned XML tags embedded beforehand in the shop template, and are stored on the RDB according to the shop ID and the DOM tree.

(4) Moreover, the information provider, when inputting event information, selling floor information or article information, selects a low-order template (a template for the event, the selling floor or the article, etc.) on the shop template (or the screen where the shop ID can be identified), and inputs the ID and the name thereof. Then, when the information provider has inputted the information in designated items in the same procedures as in the case of the shop template, the inputted information is stored as the main data on the RDB.

A standard pattern showing which item is treated as the capsule item with respect to the main data inputted in the procedures described above, is preset on the template.

For attaining this, for example ON/OFF flags may be set in the respective data items of the template. The edit program creates the shop capsule table according to the flags. It is to be noted that normally the IDs (the main data ID and the high-order data ID), the icon, the position information, a display text, a link destination URL, etc. are set as the capsule items.

This type of standard data nested structure, the XML tags and the capsule items are embedded in the template, and the information provider has no necessity of being aware of them. For instance, if there are data about the coupons, the specified article information, etc. desired by the shop side to be carried onto the information user (, i.e., desired to be captured onto MySite), however, the information provider can display the self-shop registered items on the capsule management screen of the edit program and can individually input the registered items into the information capsule (can define the registered items as the capsule items) or can remove them from the capsule. Such an operation may be done by a manipulation such as drag & drop, and so forth.

Note that normally a valid period is set in the input information (input items) from the template. The input items, of which the valid period expires, are excluded from the display object. The information itself is, however, separately saved by the server 1.

The information capsule registered as MyCapsule in MySite is never excluded from the display object even when its valid period expires. When accessing MyCapsule with its valid period expired from on the terminal 2, however, a message saying that 'the valid period of the capsule expires' is displayed.

Further, in the hierarchical structure consisting of the plurality of capsule items, when a valid period of the low-order capsule item is updated, the high-order capsule item is likewise modified in accordance with the low-order capsule item. With this contrivance, in the capsule items, as far as the low-order item has been modified and is kept valid, the high-order item is never deleted.

In the capsule items, however, the valid period is not an indispensable item, and setting thereof may be omitted.

FIG. 33 shows an example of the capsule management screen (which will hereinafter be referred to as a MyCapsule management screen 40) on which an addition, a deletion, etc. of the data item to and from MyCapsule are designated.

The information user connects to MySite by inputting the ID and the password to the server 1, and opens the MyCapsule management screen 40, wherein a list of tree-structured information capsules that are retained at the present is displayed on Window (a MyCapsule area 300 titled 'present MyCapsule').

The information user clicks the capsule item (e.g., a shop capsule named 'xx shop'), whereby a much lower-order information capsule (e.g., an article capsule of ΔΔ goods, etc) is displayed.

A capsule of which the valid period expires just when referred to (which is information of a capsule item of which a display period expires on the database for the main data of a reference source), is displayed in a capsule delete item area 302.

A capsule item that is still within the valid period but gets unnecessary can be given an indication for deleting by moving this capsule item to the capsule delete item area 302 from the MyCapsule area 300. The information user can arbitrarily effect deleting in editing the capsule items of the information capsule. On the other hand, as for the addition of the capsule item to the information capsule, the item approved by the information provider (e.g., the shop owner) as an edit object to the information user, is displayed and can be added as the information user intends.

When the information user presses a delete button 303 and thus indicates an execution of deleting the items moved to the capsule delete item area 302, all the MyCapsule items including the target capsule ID number in the capsule management table are deleted.

If the information user retains the information capsule in anticipation of a future recovery though invalid at the present, the information user may bring the information capsule back to the MyCapsule area 300 before being deleted.

Further, the information user who wishes to retain the main data permanently may download not the information capsule but the main data itself from the database.

FIG. 34 shows an example of a capsule management screen (which will hereinafter be termed a shop capsule management screen 41) used for the information provider to manage the shop capsule.

To start with, the information provider inputs a self-shop ID and a password to the server 1, whereby information of the information capsule (whose creation right and edit right are possessed by the shop) retained by the shop concerned, is displayed based on the tree structure in the shop capsule area 310.

The information provider clicks a capsule item (e.g., a selling floor capsule specified by 'oΔ selling floor'), whereby a much lower-order capsule (for instance, an article capsule of 'ΔΔ goods' etc.) is displayed.

When the information provider clicks a certain capsule item (e.g., a selling floor capsule specified by 'oΔ selling floor'), the server 1 refers to the database stored with the main data, and a list of inputted data (for example, a list of items handled on the selling floor concerned) of the hierarchy under the clicked item (selling floor), is displayed on a central window 311.

An instruction of adding the capsule item is made by selecting the target item on this window 311 and moving (drag & drop, etc.) the target item to the shop capsule area 310. Further, an instruction of deleting the capsule item is made by selecting the target item on this window 311 and moving (drag & drop, etc.) the target item to the capsule delete item area 312.

The server 1 rewrites, based on this operation, statuses (e.g., "o", "x" shown in FIG. 30) in the capsule management table.

FIG. 35 shows an example of a shop database batch management screen. In the template described above, the information per shop and the information per article are individually inputted. By contrast, the shop database match management screen provides a list-based batch management function about the information items for managing intra-building tenant information and a department store on a selling-floor-by-selling-floor basis and managing the articles handled at the shop, and so on.

The information provider accesses the server 1 and, after inputting the shop ID and the password, opens the batch management screen. On this screen, the information provider can batchwise input the items and can do batch processing of designating encapsulation of the already-modified and -inputted items. It is noted that when inputting from on this shop database batch management screen, the DOM tree may be embedded in the table and thus be managed or may also be separately defined.

FIG. 36 shows a processing outline when referring to the databases related to the building, the shop and the article. Shown herein is an example of processing by, e.g., an application program for providing the Web page and a database management program for providing the function to this application program.

In this process, the application program (e.g., a server program) issues a reference command indicating a capsule ID (e.g., a building capsule) and a hierarchy count (S201). Then, the database management program refers to the DOM tree (written as a style sheet in FIG. 36), and reads data of data items corresponding to capsule tags from records in the RDB, which are associated with a designated capsule ID and with low-order information capsule thereunder (S202).

The database management program assembles the readout data into the hierarchical structure of the information capsules according to the DOM tree, and returns the data together with the capsule management table of the information capsules to the application program (S203). At this time, there is generated the hierarchical structure for a hierarchy count designated by the application program, e.g., for three hierarchies (the building, the shop and the article).

The application program may download the hierarchical structure of the generated information capsules and the capsule management table onto the information user (terminal) in the procedure similar to that in the first embodiment and the second embodiment. Thus, the present information system operates XMLDB built up by a combination of the RDB and the DOM tree.

FIG. 37 shows a processing outline when acquiring the capsules related to the building, the shop and the article. This process starts with an acquisition command (e.g., a request for registering as MyCapsule), issued from the application program (e.g., the server program), for indicating the capsule ID (for instance, the article capsule) (S211).

In response to this acquisition command, the database management program refers to the DOM tree (written as the style sheet in FIG. 36) and thus acquires from the RDB pieces of information of the relevant information capsule (e.g., the article capsule), the high-order shop capsule above the article capsule and the building capsule including a geographical position (latitude/longitude), and also the capsule management table of these information capsules (S212). The thus acquired information capsules and the capsule management table are transferred to the application program described above (S213), and registered as MyCapsule. Further, the acquired information capsules may also be downloaded onto the browsing party terminal 2 in the same procedure as in the first embodiment and the second embodiment. The information user can edit and utilize these information capsules as he or she intends on the capsule management screen 40 (see FIG. 33).

FIG. 38 shows a display example of the information capsules based on MyBasket. MyBasket is a function of comparing and displaying a specified data item with respect to MyCapsule (the information capsules registered in MySite). This function works as follows. The information user selects and inputs a plurality of information capsules (MyCapsule) registered in MySite into MyBasket. Then, the server 1 displays a list of the relevant data irrespective of the hierarchies to which those information capsules belong.

For example, upon indicating an article name, a price and a shop name as display items, names of articles retained in the respective information capsules, prices thereof and names of shops holding these articles are displayed as a list on the basis of the data of the information capsules thrown into MyBasket. Accordingly, the information user can acquire a list of purchase-planed items to be purchased on the very day, a list of visit target shops and a total amount of budget required for shopping.

Further, the information user throws the information capsules of the same items at different shops into MyBasket, and can, if a unit numerical quantity, a unit price, etc. are displayed, make a comparison between prices.

The procedure of throwing MyCapsule into MyBasket has been explained herein, however, the shop capsule may also be thrown into MyBasket.

The capsule items, which have been once thrown into MyBasket, are moved to the MyCapsule area 300 and thus registered as MyCapsule. Further, the information in MyBasket can be deleted batchwise by pressing a clear button.

Effects of Embodiments

AS discussed above, according to the present information system, various categories of information stored in the RDB can be treated as the information capsules. Namely, the information can be smoothly transformed into the information capsules from within the RDB via the DOM tree and the capsule management table. This function enables the functions of the information capsules described in the first embodiment through the fourth embodiment to be utilized in the information system involving the use of the RDB.

Moreover, according to the present information system, the information capsule can be assembled by combining the data items desired by the information provider among the data items stored in the RDB. Further, the capsule items can be added or deleted according to the intention of the information user (the owner of MyCapsule and the terminal 2) by registering the information capsule built up as MyCapsule by the information provider (e.g., the advertiser) and downloading the information capsule onto the terminal 2. As a result, the information user can acquire the information capsule consisting of the necessary data items.

Other Applied Examples and Effects

The following applications other than the embodiments discussed above are possible by utilizing the information capsules. For instance, when providing the information via a network, the items desired by the information creating/providing party (the information provider) to be looked at preferentially by the information user, are preset as the capsule items (an integrated form of pieces of information is built up), and, when transmitting the information, this integrated form of information can be sent preferentially. This integrated form of information corresponds to a title or contents in the case of a book. With this scheme, the summarized information can be formed from among the various categories of information.

The information user can select from the summarized information the information item that meets the user's own needs and interest, and can request the more detailed information related to the summarized information. In the present situation, the hypertext link contains such a related information search function, however, the acquisition of the related information is done on a page-by-page basis and is therefore redundant and time-consuming as well.

Moreover, the utilization of the information capsule enables a considerable reduction of distributing and browsing the non-interesting information. Further, the information user has no necessity of being aware of sorting out the information capsules on the occasion of accumulating and managing the received information, wherein the information (the capsule items or the information capsule as a integrated form thereof) is automatically sorted out and managed in accordance with the original hierarchical structure set by the information provider.

Even in the case of additionally acquiring the information (the capsule items or the information capsule as a integrated form thereof) later on, the information is automatically stored in a due location in the hierarchical structure (tree structure) prepared by the information provider. Further, the information that becomes unnecessary after acquiring the information capsule can be arbitrarily deleted.

Moreover, when the information capsule is utilized, if the main data indicated by the information capsule are updated, the latest information is displayed to the information user.

Further, the information insertion/preservation period (the valid period) is set in the information, whereby the information can be deleted without individually obtaining a consent of the creator (the owner, the information provider).

Still further, the typical template suited to a service content and a content substance provided by the information provider is created, and the setting of the standard capsule items is built therein, whereby the template-based information can be provided to the information provider.

The implication of the integrated form of the information might differ depending on individual value stances such as a bundle of information valuable to the information provider and a bundle of information valuable to the party that receives and utilizes the information. If the information capsule is utilized, however, the bundle of information valuable depending on the respective needs can be readily edited.

The spread of the Internet made it possible to instantaneously gather the necessary pieces of information from the world over, however, the utilization of the information gets more difficult as the information becomes larger in quantity. If the information capsule is utilized, it is feasible to provide the mechanism for managing the information without any labor, wherein the keys (links) to reaching the information desired by the information user are structured in a compact form and utilized in a handy manner.

The fifth embodiment has exemplified the process of providing the information capsule on the basis of the combined version of the RDB and XML. The embodiment of the present invention is not, however, limited to such a scheme. For example, the main data may also be scripted in XML. Further, the information capsule may be described in a table format and may also be provided with a pointer for linking to the hierarchical relationship. Moreover, the data may be scripted in a data format other than the RDB or XML.

INDUSTRIAL APPLICABILITY

The present invention can be applied to a manufacturing industry of information devices or communication devices, a service industry utilizing the information devices or the communication devices, and a computer software industry.

What is claimed is:

1. An information providing apparatus for providing a terminal in a network with element information containing menu information for displaying an item displayed and selected as a menu and link information for specifying a link destination to be displayed upon selection of the menu by image specifying information and a second element information to be arranged on the image, comprising:

means for accepting an acquisition request of a first element information from the terminal;

means for searching for a link destination subsequent to the second element information to be arranged on a non-menu image based on the image specifying information of a link information contained in the first element information upon acceptance of the acquisition request of the first element information and for defining a spatial relationship between the non-menu image and the first element information based on the first element information, thereby collecting multiples of the element information linked within a range of a predetermined hierarchy having a low-order from the first element information;

means for adding (a) the menu information of said multiples of the element information linked within the predetermined range from the first element information to (b) the menu information of the element information of a link source having the link information for each of said multiples of the element information, thereby building up a hierarchical structure including low-order element information; and means for downloading and transmitting the multiples of the element information batchwise to be built up with the hierarchical structure to the terminal, wherein the element information and the menu information are realized as data with the element information being located to the menu information.

2. An information providing method in which a terminal in a network with element information containing menu information for displaying an item displayed and selected as a menu and link information for specifying a link destination to be displayed upon selection of the menu by image specifying information and a second element information to be arranged on the image, comprising:

accepting an acquisition request of a first element information from the terminal;

searching for a link destination subsequent to the second element information to be arranged on a non-menu image based on the image specifying information of a link information contained in the first element information upon acceptance of the acquisition request of the first element information and for defining a spatial relationship between the non-menu image and the first element information based on the first element information, thereby collecting multiples of the element information linked within a range of a predetermined hierarchy having a low-order from the first element information;

adding (a) the menu information of said multiples of the element information linked within the predetermined range from the first element information to (b) the menu information of the element information of a link source having the link information to each of said multiples of the element information, thereby building up a hierarchical structure including low-order element information; and downloading and transmitting the multiples of the element information batchwise to be built up with the hierarchical structure to the terminal, wherein the element information and the menu information are realized as data with the element information being located to the menu information.

3. A program and the method executed by a processor stored on a computer-readable medium that terminal in a network with element information containing menu information for displaying an item displayed and selected as a menu and link information for specifying a link destination to be displayed upon selection of the menu by image specifying information and a second element information to be arranged on the image, comprising:

accepting an acquisition request of a first element information from the terminal;

searching for a link destination subsequent to the second element information to be arranged on a non-menu image based on the image specifying information of a link information contained in the first element information upon acceptance of the acquisition request of the first element information and for defining a spatial relationship between the non-menu image and the first element information based on the first element information, thereby collecting multiples of the element information linked within a range of a predetermined hierarchy having a low-order from the first element information;

adding (a) the menu information of said multiples of the element information linked within the predetermined range from the first element information to (b) the menu information of the element information of a link source having the link information to each of said multiples of the element information, thereby building up a hierarchical structure including low-order element information; and downloading and transmitting the multiples of the element information batchwise to be built up with the hierarchical structure to the terminal, wherein the element information and the menu information are realized as data with the element information being located to the menu information.

* * * * *